US012321064B1

United States Patent
Wi et al.

(10) Patent No.: US 12,321,064 B1
(45) Date of Patent: Jun. 3, 2025

(54) DISPLAY APPARATUS

(71) Applicant: SAMSUNG ELECTRONICS CO., LTD., Suwon-si (KR)

(72) Inventors: Sunghee Wi, Suwon-si (KR); Ajeong Kang, Suwon-si (KR); Youngmin Lee, Suwon-si (KR); Dukjin Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/905,717

(22) Filed: Oct. 3, 2024

Related U.S. Application Data

(63) Continuation of application No. PCT/KR2024/096135, filed on Sep. 11, 2024.

(30) Foreign Application Priority Data

Dec. 1, 2023 (KR) .................... 10-2023-0172803

(51) Int. Cl.
   *G02F 1/00* (2006.01)
   *G02F 1/1335* (2006.01)
   *G02F 1/13357* (2006.01)

(52) U.S. Cl.
   CPC .. *G02F 1/133612* (2021.01); *G02F 1/133603* (2013.01); *G02F 1/133608* (2013.01)

(58) Field of Classification Search
   None
   See application file for complete search history.

(56) References Cited

U.S. PATENT DOCUMENTS

| 8,267,539 B2 | 9/2012 | Park |
| 8,305,516 B2 | 11/2012 | Cho et al. |

(Continued)

FOREIGN PATENT DOCUMENTS

| JP | 2009044099 A | * | 2/2009 | ....... G02F 1/133603 |
| JP | 2009152636 A | * | 7/2009 | ....... G02F 1/133603 |

(Continued)

OTHER PUBLICATIONS

International Search Report and Written Opinion (PCT/ISA/210 and PCT/ISA/237) dated Jan. 7, 2025, issued by International Searching Authority in International Application No. PCT/KR2024/096135.

*Primary Examiner* — Gerald J Sufleta, II
(74) *Attorney, Agent, or Firm* — Sughrue Mion, PLLC

(57) ABSTRACT

A display apparatus includes a display panel, a plurality of light source substrates, a plurality of light sources mounted on the plurality of light source substrates and configured to emit light toward the display panel, a driving board configured to control operation of each of the plurality of light sources, a plurality of connectors electrically connected to the driving board by an electric wire and arranged on the plurality of light source substrates, and a bottom chassis including vertical borders extending and configured to support the plurality of light source substrates. Each of the plurality of light source substrates includes a substrate body, and a plurality of substrate bars horizontally extending from the substrate body. The substrate body of some of the plurality of light source substrates is farther from the vertical border of the bottom chassis in the horizontal direction than the plurality of substrate bars.

20 Claims, 17 Drawing Sheets

(56) References Cited

U.S. PATENT DOCUMENTS

| | | | | |
|---|---|---|---|---|
| 2003/0072153 | A1* | 4/2003 | Matsui | F21V 29/89 |
| | | | | 362/800 |
| 2007/0242477 | A1* | 10/2007 | Yoo | H05K 1/0206 |
| | | | | 362/612 |
| 2008/0143916 | A1 | 6/2008 | Fujino et al. | |
| 2010/0165240 | A1* | 7/2010 | Cho | G02F 1/133603 |
| | | | | 349/61 |
| 2014/0307420 | A1* | 10/2014 | Ishizuka | G02F 1/133603 |
| | | | | 362/97.1 |
| 2015/0198293 | A1 | 7/2015 | Lankhorst et al. | |
| 2020/0041845 | A1 | 2/2020 | Yoshinaga et al. | |

FOREIGN PATENT DOCUMENTS

| | | |
|---|---|---|
| JP | 4514825 B2 | 7/2010 |
| JP | 2021-197356 A | 12/2021 |
| KR | 10-2010-0080024 A | 7/2010 |
| KR | 10-2010-0092696 A | 8/2010 |
| KR | 10-2015-0038787 A | 4/2015 |
| KR | 10-2022-0139269 A | 10/2022 |
| KR | 10-2023-0026128 A | 2/2023 |

* cited by examiner

DISPLAY APPARATUS

CROSS REFERENCE TO RELATED APPLICATIONS

This application is a continuation of International Application No. PCT/KR2024/096135, filed on Sep. 11, 2024, which is based on and claims priority to Korean Patent Application No. 10-2023-0172803, filed on Dec. 1, 2023, in the Korean Intellectual Property Office, the disclosures of which are incorporated by reference herein in their entireties.

BACKGROUND

1. Field

The present disclosure relates to a display apparatus.

2. Description of the Related Art

The display apparatus is a kind of output devices for displaying obtained or stored electrical information for the user by converting the electrical information to visual information, and is used in various fields such as homes or work places.

There are many different display apparatuses such as monitor devices connected to personal computers (PCs) or server computers, portable computer systems, global positioning system (GPS) terminals, general television sets, Internet protocol televisions (IPTVs), portable terminals, e.g., smart phones, tablet PCs, personal digital assistants (PDAs), and cellular phones, various display apparatuses for reproducing images like advertisements or films, or other various kinds of audio/video systems.

The display apparatus includes a light source module to convert electrical information to visual information, and the light source module includes a plurality of light sources to separately emit light.

Each of the plurality of light sources includes, for example, a light emitting diode (LED) or an organic LED (OLED). For example, the LED or the OLED may be mounted on a circuit board or a substrate.

SUMMARY

Provided is a display apparatus having an enhanced structure which may save manufacturing costs of the product.

Provided is a display apparatus having an enhanced structure to reduce noise from electric wires.

Provided is a display apparatus having an enhanced structure to prevent electric wires from being interfered with other components of the display apparatus.

Provided is a display apparatus having an enhanced structure which may improve manufacturing efficiency of the product.

Technological objectives of the disclosure are not limited to what are mentioned above, and throughout the specification, it will be clearly appreciated by those of ordinary skill in the art that there may be other technological objectives unmentioned.

According to an aspect of the disclosure, a display apparatus may include a display panel, a plurality of light source substrates, a plurality of light sources mounted on the plurality of light source substrates and configured to emit light toward the display panel, a driving board configured to control operation of each of the plurality of light sources, a plurality of connectors electrically connected to the driving board by an electric wire and arranged on the plurality of light source substrates, and a bottom chassis including vertical borders and configured to support the plurality of light source substrates. Each of the plurality of light source substrates may include a substrate body with one or more of the plurality of connectors arranged thereon, and a plurality of substrate bars horizontally extending from the substrate body and on which the plurality of light sources are mounted. The substrate body of some of the plurality of light source substrates may be farther from the vertical border of the bottom chassis in a horizontal direction than the plurality of substrate bars.

The vertical borders of the bottom chassis may be provided in a pair. Each of the plurality of substrate bars, of one of the plurality of light source substrates adjacent to one of the pair of vertical borders, may extend from the substrate body toward one vertical border. Each of the plurality of substrate bars, of another one of the plurality of light source substrates adjacent to another one of the pair of vertical borders, may extend from the substrate body toward another vertical border.

A horizontal distance between the one vertical border and the one of the plurality of light source substrates may correspond to a horizontal distance between the another vertical border and the another one of the plurality of light source substrates.

The vertical borders of the bottom chassis may be provided in a pair. Each of the plurality of substrate bars, of one of the plurality of light source substrates closest to one of the pair of vertical borders, may extend from the substrate body in a direction away from the driving board. Each of the plurality of substrate bars, of another one of the plurality of light source substrates closest to another one of the pair of the vertical borders, may extend from the substrate body in the direction away from the driving board.

The vertical borders of the bottom chassis may be provided in a pair, the pair of vertical borders may include a first vertical border and a second vertical border facing each other. The plurality of light source substrates may include a pair of first light source substrates respectively arranged closest to the pair of vertical borders, and a second light source substrate between the pair of first light source substrates. The plurality of substrate bars, of one first light source substrate of the pair of first light source substrates closer to the first vertical border than to the second vertical border, may extend from the substrate body toward the first vertical border. The plurality of substrate bars, of another first light source substrate of the pair of first light source substrates closer to the second vertical border than to the first vertical border, may extend from the substrate body toward the second vertical border.

The substrate body of the second light source substrate may be adjacent to the substrate body of the one first light source substrate among the pair of first light source substrates. The plurality of substrate bars of the second light source substrate may extend from the substrate body of the second light source substrate toward the substrate body of the another first light source substrate among the pair of first light source substrates in the horizontal direction.

The vertical borders of the bottom chassis may be provided in a pair, the pair of vertical borders may include a first vertical border and a second vertical border facing each other. The plurality of light source substrates may include a pair of first light source substrates respectively arranged closest to the pair of vertical borders, and a pair of second light source substrates between the pair of first light source substrates. The plurality of substrate bars, of one second light source substrate among the pair of second light source substrates arranged closer to the first vertical border than to the second vertical border, may extend from the substrate body toward the first vertical border. The plurality of substrate bars, of another second light source substrate among the pair of second light source substrates closer to the second vertical border than to the first vertical border, may extend from the substrate body toward the second vertical border.

A horizontal distance between the first vertical border and the one second light source substrate may correspond to a horizontal distance between the second vertical border and the another second light source substrate.

A distance between the substrate body of each of the pair of second light source substrates and the driving board may be shorter than the distance between the substrate body of each of the pair of first light source substrates and the driving board.

The vertical borders of the bottom chassis may be provided in a pair, the pair of vertical borders may include a first vertical border and a second vertical border facing each other. The plurality of light source substrates may include a pair of first light source substrates respectively arranged closest to the pair of vertical borders, and a pair of second light source substrates between the pair of first light source substrates. The plurality of substrate bars, of one second light source substrate among the pair of second light source substrates closer to the first vertical border than to the second vertical border, may extend from the substrate body in a direction away from the first vertical border. The plurality of substrate bars, of another second light source substrate among the pair of second light source substrates closer to the second vertical border than to the first vertical border, may extend from the substrate body in the direction away from the second vertical border.

The plurality of light source substrates may include a third light source substrate arranged between the pair of second light source substrates.

The third light source substrate may include a pair of third light source substrates facing each other in the horizontal direction. The plurality of substrate bars, of one third light source substrate among the pair of third light source substrates closer to the first vertical border than to the second vertical border, may extend from the substrate body toward the first vertical border. The plurality of substrate bars, of another third light source substrate among the pair of third light source substrates closer to the second vertical border than to the first vertical border, may extend from the substrate body toward the second vertical border.

The driving board and the electric wire may be arranged on a rear surface of the bottom chassis. The bottom chassis may include a plurality of projections protruding from the rear surface of the bottom chassis. Each connector of the plurality of connectors on the substrate body of each of the pair of second light source substrates may pass through a portion of the bottom chassis spaced apart from the plurality of projections.

The plurality of light source substrates may be arranged in a plurality of columns and each of the plurality of columns may extend in a vertical direction of the bottom chassis and may be arranged in the horizontal direction of the bottom chassis from each other. The light source substrates, which are included in one of the plurality of columns, may include the plurality of substrate bars arranged in the vertical direction of the bottom chassis, and the substrate body in the vertical direction of the bottom chassis.

The driving board may be in a center portion of the bottom chassis.

According to an aspect of the disclosure, a display apparatus may include a display panel, a plurality of light source substrates, a plurality of light sources mounted on the plurality of light source substrates and configured to emit light toward the display panel, a driving board configured to control operation of each of the plurality of light sources, a plurality of connectors electrically connected to the driving board by an electric wire and arranged on each of the plurality of light source substrates, and a bottom chassis including vertical borders extending in a vertical direction and configured to support the plurality of light source substrates and the driving board. Each of the plurality of light source substrates may include a substrate body with one or more of the plurality of connectors arranged thereon, and a plurality of substrate bars extending from the substrate body in a horizontal direction and on which the plurality of light sources are mounted. The plurality of substrate bars, of some light source substrates adjacent to the vertical border of the bottom chassis among the plurality of light source substrates, may extend from the substrate body in a direction away from the driving board.

The plurality of light source substrates may include a plurality of first light source substrates arranged closest to the vertical borders of the bottom chassis, and a second light source substrate between the plurality of first light source substrates and parallel to the plurality of first light source substrates in the horizontal direction. The substrate body of the second light source substrate may be adjacent to the substrate body of one first light source substrate among the plurality of first light source substrates in the horizontal direction. The plurality of substrate bars of the second light source substrate may extend from the substrate body of the second light source substrate toward the substrate body of another first light source substrate among the plurality of first light source substrates in the horizontal direction.

The plurality of light source substrates may include a plurality of first light source substrates arranged closest to the vertical borders of the bottom chassis, and a plurality of second light source substrates between the plurality of first light source substrates and parallel to the plurality of first light source substrates in the horizontal direction. Each of the plurality of first light source substrates may include the plurality of substrate bars extending from the substrate body in the direction away from the driving board. Each of the plurality of second light source substrates may include the plurality of substrate bars extending from the substrate body in the direction away from the driving board.

The plurality of light source substrates may include a plurality of first light source substrates arranged closest to the vertical borders of the bottom chassis, and a plurality of second light source substrates between the plurality of first light source substrates and parallel to the plurality of first light source substrates in the horizontal direction. Each of the plurality of first light source substrates may include the plurality of substrate bars extending from the substrate body in the direction away from the driving board. Each of the plurality of second light source substrates may include the plurality of substrate bars extending from the substrate body in a direction towards to the driving board.

According to an aspect of the disclosure, a display apparatus may include a display panel, a display case configured to support the display panel, a plurality of light source substrates accommodated in the display case, a plurality of light sources mounted on the plurality of light source substrates and configured to emit light toward the display panel, and a driving board accommodated in the display case and configured to control operation of each of the plurality of light sources. Each of the plurality of light source substrates may include a substrate body extending in a first direction and electrically connected to the driving board by an electric wire, and a plurality of substrate bars extending from the substrate body in a second direction different from the first direction and on which the plurality of light sources are mounted. The substrate body of some light source substrates, of the plurality of light source substrates closest to borders of the display case in the second direction, may be further away from the borders of the display case in the second direction than the plurality of substrate bars.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
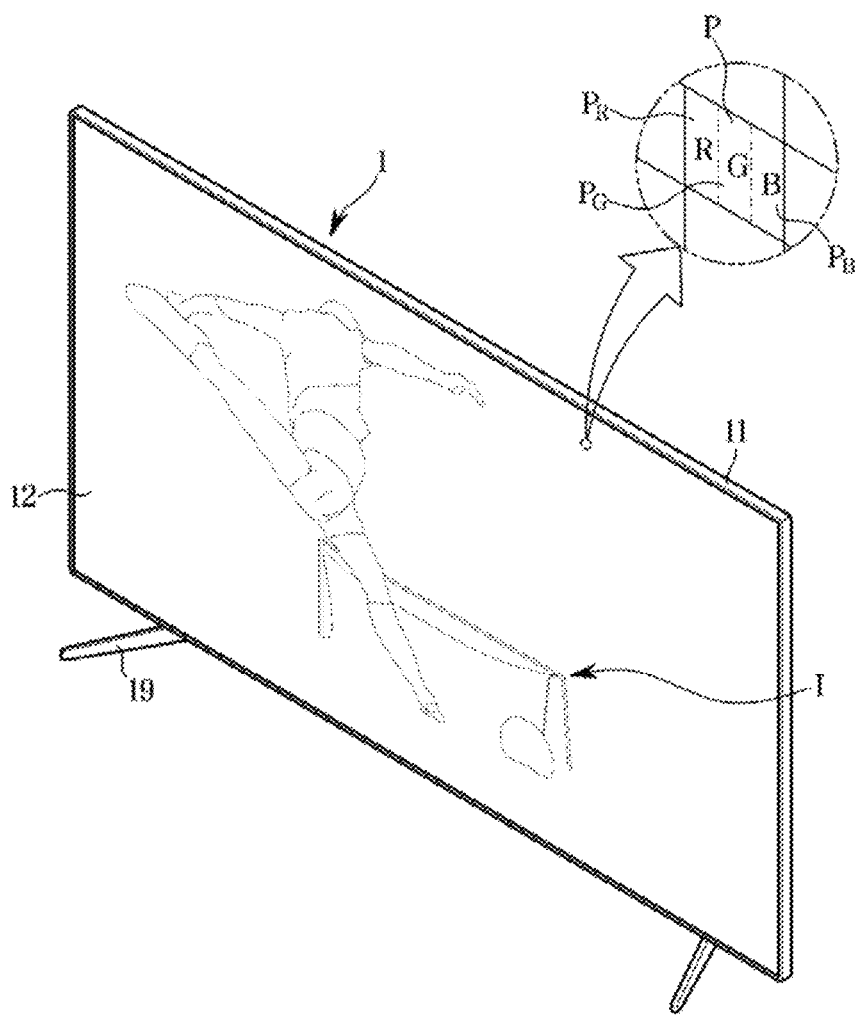
FIG. 1 illustrates a display apparatus, according to some embodiments of the disclosure.
Figure 1:
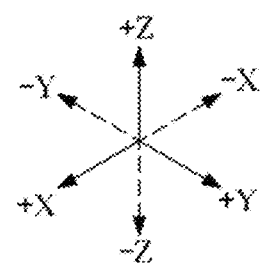

Embodiments and features as described and illustrated in the disclosure are merely examples, and there may be various modifications replacing the embodiments and drawings at the time of filing this application.

Throughout the drawings, like reference numerals refer to like parts or components.

The singular form of a noun corresponding to an item may include one or more items unless the context states otherwise.

Throughout the specification, "A or B", "at least one of A and B", "at least one of A or B", "A, B or C", "at least one of A, B and C", and "at least one of A, B, or C" may each include any one or all the possible combinations of A, B and C.

A unit, module or member may be implemented in hardware or software. A plurality of units, modules or members may be implemented as one component, or a single unit, module or member may include multiple components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first component discussed below could be termed a second component and vice versa, without departing from the teachings of the disclosure. Descriptions shall be understood as to include any and all combinations of one or more of the associated listed items when the items are described by using the conjunctive term "~and/or ~," or the like.

When an element is mentioned as being "coupled" or "connected" to another element with or without an adverb "functionally" or "operatively", it means that the element may be connected to the other element directly (e.g., wiredly), wirelessly, or through a third element.

When an element is mentioned as being "connected to", "coupled to", "supported on" or "contacting" another element, it includes not only a case that the elements are directly connected to, coupled to, supported on or contact each other but also a case that the elements are connected to, coupled to, supported on or contact each other through a third element.

Throughout the specification, when an element is mentioned as being located "on" another element, it implies not only that the element is abut on the other element but also that a third element exists between the two elements.

The terms "up-down direction", "front-back direction", etc., as herein used are defined with respect to the drawings, but the terms may not restrict the shape and position of the respective components. For example, the term "front or forward" and "back or rearward" may be defined with respect to an X-direction as shown in the accompanying drawings. The term "up" and "down" may be defined with respect to a Z-direction as shown in the accompanying drawings. The term "left" and "right" may be defined with respect to a Y-direction as shown in the accompanying drawings. The term "vertical direction" may refer to the Z-direction as shown in the drawings, and the term "horizontal direction" may refer to the Y-direction as shown in the drawings.

Reference will now be made in detail to embodiments of the disclosure, which are illustrated in the accompanying drawings.

FIG. 1 illustrates a display apparatus, according to some embodiments of the disclosure.

Referring to FIG. 1, the display apparatus 1 is a device that is able to process an image signal received from the outside and visually present the processed image. Although the display apparatus 1 is shown as a television (TV) in FIG. 1, embodiments of the disclosure are not limited thereto. For example, the display apparatus 1 may be implemented in various forms such as a monitor that is a sort of computer output device, a portable multimedia device, a portable communication device, and any device capable of visually presenting images, without being limited thereto.

The display apparatus 1 may be a large format display (LFD) installed outdoors such as on a rooftop of a building or at a bus stop. The display apparatus 1 is not, however, exclusively installed outdoors, but may be installed at any place, even indoors with a lot of foot traffic, e.g., at subway stations, shopping malls, theaters, offices, stores, etc.

Although the display apparatus 1 is illustrated as a flat display apparatus with a flat screen in FIG. 1, the display apparatus according to the disclosure may be equally applied to a curved display apparatus or a bendable or flexible display apparatus that is variable between a flat state and a curved state. The configuration of the disclosure may also be applied to many different forms of display apparatuses regardless of the screen size or ratio of the display apparatuses.

The display apparatus 1 may receive contents including video and audio signals from various content sources and output video and audio corresponding to the video and audio signals. For example, the display apparatus 1 may receive content data through a broadcast receiving antenna or a cable, receive content data from a content reproducing device, or receive content data from a content providing server of a content provider.

The display apparatus 1 may display an image corresponding to the video data, and output sound corresponding to the audio data. For example, the display apparatus 1 may reconstruct a plurality of image frames included in the video data and display the plurality of image frames successively. Furthermore, the display apparatus 1 may reconstruct an audio signal included in the audio data and successively output sounds based on the audio signal.

As shown in FIG. 1, the display apparatus 1 may include a main body 11 and a screen 12 for displaying an image I.

The display apparatus 1 may be installed in a standing manner on an indoor or outdoor floor or furniture, or may be installed on a wall or inside the wall in a wall-mounted manner. For example, the display apparatus 1 may include support legs 19 provided underneath the main body 11 to be installed in the standing manner on the indoor or outdoor floor or furniture.

The main body 11 may define the exterior of the display apparatus 1. There may be components arranged in the main body 11 for the display apparatus 1 to perform various functions such as displaying the image I.

The display apparatus 1 may be configured to display the image I. Specifically, the screen 12 may be formed on the front of the main body 11, and the display apparatus 1 may display the image I through the screen 12. For example, the screen 12 may display still images or moving images. For example, the screen 12 may display two dimensional (2D) plane images, or three dimensional (3D) stereographic images using parallax of both eyes of the user.

A plurality of pixels P may be formed on the screen 12. The image I displayed on the screen 12 may be formed by light emitted by each of the plurality of pixels P. For example, the light emitted by the plurality of pixels P may be combined like mosaics into the image I on the screen 12.

The plurality of pixels P may emit light in various colors and brightness. Specifically, each of the plurality of pixels P may include subpixels $P_R$, $P_G$, and $P_B$, and the subpixels $P_R$, $P_G$, and $P_B$ may include a red subpixel $P_R$ to emit red light, a green subpixel $P_G$ to emit green light, and blue subpixel $P_B$ to emit blue light. For example, the red light may have wavelengths of about 620 nanometers (nm, a billionth of a meter) to about 750 nm; green light may have wavelengths of about 495 nm to about 570 nm; blue light may have wavelengths of about 450 nm to about 495 nm.

By combinations of the light emitted from each of the red subpixel $P_R$, the green subpixel $P_G$, and the blue subpixel $P_B$, each of the plurality of pixels P may emit various brightness and colors of light.

Figure 2:
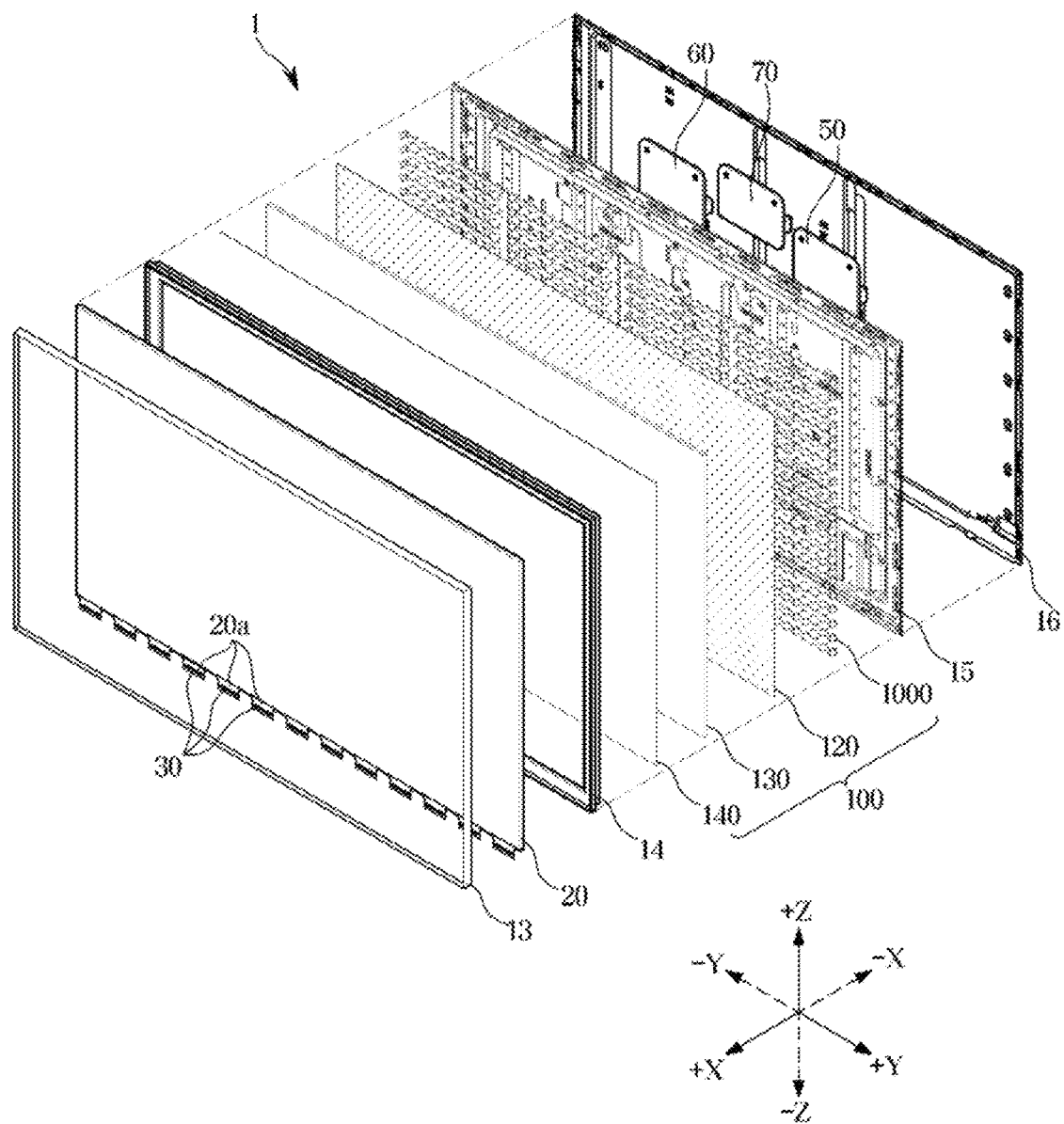
FIG. 2 is an exploded view of a display apparatus according to some embodiments of the disclosure.

FIG. 2 is an exploded view of a display apparatus, according to some embodiments of the disclosure.

Referring to FIG. 2, many different kinds of components to produce the image I on the screen 12 may be equipped in the main body 11 of the display apparatus 1.

For example, the display apparatus 1 may include a display panel 20. The display panel 20 may be included in the main body 11. The display panel 20 may be configured to display the image I. The screen 12 as described above in connection with FIG. 1 may be formed on the front of the display panel 20.

For example, the display panel 20 may have the form of almost a rectangle. Specifically, the display panel 20 may have a form that has different vertical and horizontal lengths. That is, the display panel 20 may have long sides and short sides. The display panel 20 may be shaped like a rectangular plate. It is not, however, limited thereto, and the display panel 20 may have the form of a square plate with long and short sides being almost the same.

The display panel 20 may be formed in various sizes. A ratio of long side to short side of the display panel 20 is not limited to a general case such as 16:9 or 4:3, but may be any ratio.

In an embodiment of the disclosure, in the display apparatus 1, the display panel 20 may be configured as a non-emissive display type panel such as a liquid crystal display (LCD).

On one side of the display panel 20, provided are a cable 20a for transmitting image data to the display panel 20 and a display driver integrated circuit (DDI) 30 (hereinafter, called a 'driver IC') for processing digital image data to output an analog image signal.

The cable 20a may electrically connect between printed circuit board assemblies (PBAs) 50, 60 and 70 and the driver IC 30 and further between the driver IC 30 and the display panel 20. The cable 20a may include a flexible flat cable or a film cable that is bendable.

The driver IC 30 may receive image data and power from the PBAs 50, 60 and 70 through the cable 20*a*, and transmit image data and driving current to the display panel 20 through the cable 20*a*.

Furthermore, the cable 20*a* and the driver IC 30 may be integrally implemented as a film cable, a chip on film (COF), a table carrier package (TCP), etc. In other words, the driver IC 30 may be arranged on the cable 20*a*. It is not, however, limited thereto, and the driver IC 30 may be arranged on the display panel 20.

A structure of the display panel 20 will be described later in detail.

The display apparatus 1 may include a backlight unit 100 configured to emit light toward the display panel 20. The backlight unit 100 may be arranged in the main body 11. The backlight unit 100 is placed behind the display panel 20 to emit light in a forward direction where the display panel 20 is located. Specifically, the backlight unit 100 may be configured with a surface light source. The display panel 20 may block or pass the light emitted from the backlight unit 100.

The backlight unit 100 may include point light sources for emitting monochromatic light or white light, and may be configured to refract, reflect, and diffuse the light emitted from the point light sources to convert the light to uniform surface light. The backlight unit 100 may emit the uniform surface light in a forward direction by refracting, reflecting and diffusing the light emitted from the point light sources.

As shown in FIG. 2, the backlight unit 100 may include a light source module 1000. The light source module 1000 may generate and emit light. Specifically, the light source module 1000 may be configured to emit monochromatic light or white light.

Figure 4:
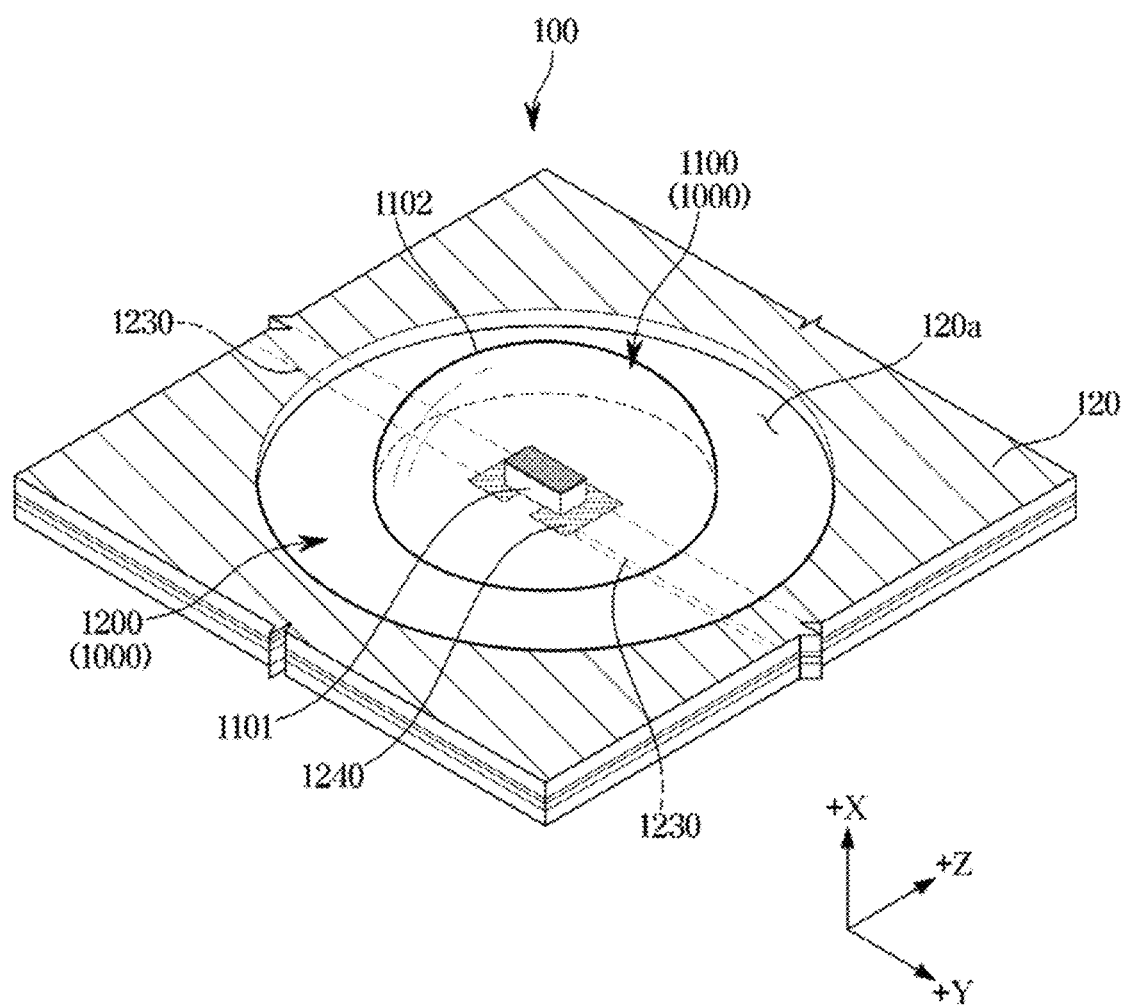
FIG. 4 is an enlarged view of a light source and a reflection sheet of a display apparatus according to some embodiments of the disclosure.

The light source module 1000 may include a plurality of light sources 1100 for emitting light, and a light source substrate 1200 on which the plurality of light sources 1100 are mounted (see FIG. 4).

The light source module will be described later in detail.

As shown in FIG. 2, the backlight unit 100 may include a reflective sheet 120 arranged to reflect light. The reflective sheet 120 may reflect light to the forward or almost forward direction.

For example, the reflective sheet 120 may be attached to the front surface of the light source module 1000. Specifically, the reflective sheet 120 may be attached to the front surface of the light source substrate 1200.

For example, the light source module 1000 (specifically, light sources 1100 of the light source module 1000, (see FIG. 4)) may emit light from the front of the reflective sheet 120 into various directions. The light emitted from the light source module 1000 may be emitted not only toward a diffuser plate 130, which will be described below, but also toward the reflective sheet 120 from the light source module 1000, and the reflective sheet 120 may reflect the light emitted to the reflective sheet 120 toward the diffuser plate 130.

Also, part of the light emitted from the light source module 1000 may reflect from a surface of the diffuser plate 130 and an optical sheet 140 while passing through various objects such as the diffuser plate 130 and the optical sheet 140, in which case the reflective sheet 120 may reflect the reflected light back to the forward direction.

As shown in FIG. 2, the backlight unit 100 may include the diffuser plate 130 arranged to uniformly diffuse the light. The diffuser plate 130 may be arranged in front of the light source module 1000 and the reflective sheet 120. The diffuser plate 130 may uniformly diffuse the light emitted from the light source module 1000 and then emit the light in the forward direction.

As shown in FIG. 2, the backlight unit 100 may include the reflector sheet 140 arranged to enhance brightness and uniformity in brightness of the emitted light. The optical sheet 140 may be arranged to refract and scatter the light emitted from the front surface of the diffuser plate 130. For example, the optical sheet 140 may include various types of sheets such as a diffuser sheet, a prism sheet, a reflective polarizer sheet, a quantum dot sheet, etc.

The display apparatus 1 may include the main board 50 and the driving board 70 for controlling operations of the backlight unit 100 and the display panel 20, and the power supply board 60 for supplying power to the backlight unit 100 and the display panel 20. The main board 50, the power supply board 60 and the driving board 70 may be electrically connected to one another. The main board 50, the power supply board 60 and the driving board 70 may be arranged in the main body 11.

The main board and/or driving board 70 may include a control circuit for controlling operations of the display panel 20 and the backlight unit 100. The control circuit may process image data received from an external content source, transmit the image data to the display panel 20, and transmit dimming data to the backlight unit 100.

For example, the main board 50 may output content data in a format that may be output from the display panel 20 or a speaker by processing a video signal/audio signal. The main board 50 may control the driving board 70. The main board 50 may be connected to the display panel 20 to control the display panel 20.

The driving board 70 may be connected to the light source module 1000 to control the light source module 1000. The driving board 70 may transmit a driving current to the light source module 100 based on a control signal of the main board 50. The driving board 70 may be connected to the light source substrate 1200 (see FIG. 4) to control on/off operation of the plurality of light sources 1100 (see FIG. 4).

The power supply board 60 may supply power to the display panel 20 and the backlight unit 100 so as for the backlight unit 100 to output surface light and for the display panel 20 to block or pass the light from the backlight unit 100.

Although the main board 50, the driving board 70 and the power supply board 60 are illustrated as separate board assemblies in FIG. 2, the main board 50, the driving board 70 and the power supply board 60 may be configured in an integrated board assembly.

Each of the PBAs 50, 60 and 70 may be implemented with a printed circuit board (PCB) and various circuits mounted on the PCB. For example, the power circuit may include a power circuit board, and a capacitor, a coil, a resistor, a processor, etc., which are mounted on the power circuit board. Furthermore, the control circuit may include a control circuit board with a memory and a processor mounted thereon.

The display apparatus 1 may include a display case arranged to support various parts of the main body 11 of the display apparatus 1. In other words, various parts of the main body 11 may be accommodated in the display case. The display case may define the exterior of the display apparatus 1.

For example, the display case may support the display panel 20. For example, the display case may support the backlight unit 100. For example, the display case may support the main board 50. For example, the display case may support the power supply board 60. For example, the display case may support the driving board 70.

For example, the display apparatus 1 may include a top chassis 13. The top chassis 13 may support the front or side of the display panel 20. For example, the top chassis 13 may be shaped substantially like a rectangular frame.

The top chassis 13 may form a bezel placed toward the front of the display apparatus 1 to support the front of the display panel 20. However, in a case that the display apparatus 1 is a bezel-less type display apparatus without bezel or with very narrow bezel, the top chassis 13 may be arranged to support only the sides of the display panel 20. Alternatively, when a bottom chassis 15 supports the sides of the display panel 20, the display apparatus 1 may not include the top chassis 13.

For example, the display apparatus 1 may include the bottom chassis 15. The bottom chassis 15 may cover the back of the display panel 20. The bottom chassis 15 may be coupled to the back of the top chassis 13. The bottom chassis 15 may support various parts of the display apparatus 1 such as the backlight unit 100, the main board 50, the power supply board 60, the driving board, etc.

The bottom chassis 15 may be formed to have the shape of a substantially flat plate, but is not limited thereto. The bottom chassis 15 may be formed to have a material having high thermal conductivity to radiate heat produced from the backlight unit 100 to the outside. For example, the bottom chassis 15 may be formed to have a metal substance such as aluminum, SUS, etc., or a plastic substance such as ABS.

For example, the display apparatus 1 may include a middle mold 14. The middle mold 14 may be arranged between the top chassis 13 and the bottom chassis 15. For example, the middle mold 14 may support at least some components of the backlight unit 100.

For example, the display apparatus 1 may include a rear cover 16. The rear cover 16 may be placed behind the bottom chassis 15 to cover the bottom chassis 15 and various components (e.g., the main board 50, the power supply board 60, the driving board 70, etc.) equipped on the back of the bottom chassis 15.

In the meantime, unlike what is shown in FIG. 2, the display case of the display apparatus 1 may not include some of the top chassis, the middle mold, the bottom chassis and the rear cover.

The configuration of the display apparatus 1 as described above in connection with FIG. 2 is merely an example of a display apparatus according to the disclosure, without being limited thereto. The display apparatus according to the disclosure may be configured to include various components to perform a function that provides an image through the screen.

Figure 3:
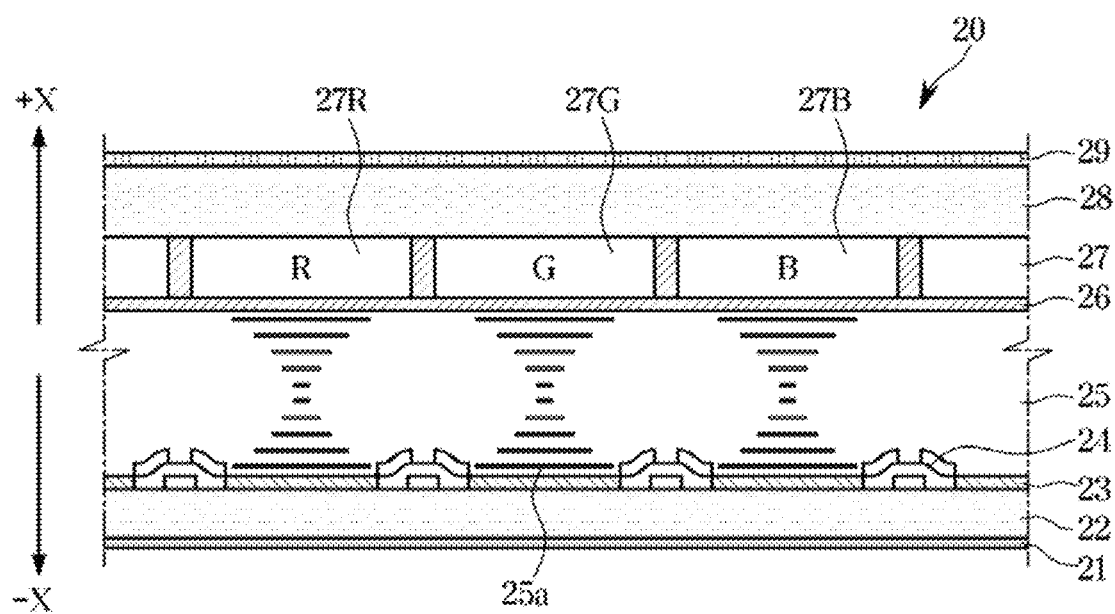
FIG. 3 is a cross-sectional view of a liquid crystal panel of a display apparatus according to some embodiments of the disclosure.

FIG. 3 is a cross-sectional view of a liquid crystal panel of a display apparatus, according to some embodiments of the disclosure.

Referring to FIG. 3, the display panel 20 included in the display apparatus 1 may be configured as a liquid crystal display (LCD) panel to block or pass the light emitted from the backlight unit 100. By the operation of the display panel 20 blocking or passing the light emitted from the backlight unit 100, the image I may be formed on the front of the display panel 20.

The front surface of the display panel 20 may constitute the aforementioned screen 12 of the display apparatus 1. A plurality of pixels P may be arranged on the display panel 20. The plurality of pixels P arranged on the display panel 20 may each separately block or pass the light from the backlight unit 100, and the light having passed the plurality of pixels P may form the image I to be displayed on the screen 12.

For example, as shown in FIG. 3, the display panel 20 may include a first polarizer film 21, a first transparent substrate 22, a pixel electrode 23, a thin film transistor (TFT) 24, a liquid crystal layer 25, a common electrode 26, a color filter 27, a second transparent substrate 28, and a second polarizer film 29.

The first transparent substrate 22 and the second transparent substrate 28 may securely support the pixel electrode 23, the TFT 24, the liquid crystal layer 25, the common electrode 26, and the color filter 27. The first and second transparent substrates 22 and 28 may be formed of tempered glass or transparent resin.

On the outer surfaces of the first and second transparent substrates 22 and 28, the first and second polarizer films 21 and 29 may be applied, respectively.

The first and second polarizer films 21 and 29 may each pass particular light while blocking the other light. For example, the first polarizer film 21 passes light having a magnetic field oscillating in a first direction while blocking the other light. The second polarizer film 29 passes light having a magnetic field oscillating in a second direction while blocking the other light. The first and second directions may be perpendicular to each other. Accordingly, a polarization direction of light passed by the first polarizer film 21 and an oscillation direction of light passed by the second polarizer film 29 may be perpendicular to each other. As a result, the light in general may not pass both the first and second polarizer films 21 and 29 at the same time.

The color filter 27 may be arranged on the inner side of the second transparent substrate 28.

The color filter 27 may include, for example, a red color filter 27R for passing red light, a green color filter 27G for passing green light, and a blue color filter 27B for passing blue light, and the red, green, blue color filters 27R, 27G, and 27B may be arranged side by side. An area in which the color filter 27 is formed may correspond to the pixel P as described above. An area where the red color filter 27R is formed may correspond to the red subpixel $P_R$; an area where the green color filter 27G is formed may correspond to the green subpixel $P_G$; an area where the blue color filter 27B is formed may correspond to the blue subpixel $P_B$.

The pixel electrode 23 may be provided on the inner side of the first transparent substrate 22, and the common electrode 26 may be provided inside from the second transparent substrate 28.

The pixel electrode 23 and the common electrode 26 are formed of an electrically conductive metal material, and may produce an electric field to change the layout of liquid crystal molecules 25a that form the liquid crystal layer 25, which will be described below.

The pixel electrode 23 and the common electrode 26 may be formed of a transparent material to pass the incident light from the outside. For example, the pixel electrode 23 and the common electrode 26 may also be formed of indium tin oxide (ITO), indium zinc oxide (IZO), silver (Ag) nano wire, carbon nano tube (CNT), graphene, or 3,4-ethylenedioxythiophene (PEDOT). The TFTs 24 may be arranged inside the second transparent substrate 28.

The TFT 24 may pass or block the current flowing to the pixel electrode 23. For example, depending on whether the TFT 24 is turned on (closed) or turned off (opened), an electric field may be formed or removed from between the pixel electrode 23 and the common electrode 26.

The TFT 24 may be formed of poly-silicon, and formed using a semiconductor process, such as lithography, deposition, or ion implantation process.

The liquid crystal layer 25 may be formed between the pixel electrode 23 and the common electrode 26. The liquid crystal layer 25 may be filled with liquid crystal molecules 25a.

The liquid crystals are in an intermediate state between solid (crystal) and fluid. Most liquid crystal materials are organic compounds, the molecules of which are shaped like thin and long rods, and the arrangement of the molecules are irregular in a direction and regular in another direction. As a result, the liquid crystal may have both fluidity of a liquid and optical anisotropy of a crystal (solid).

Furthermore, the liquid crystals may show an optical property according to a change in electric field. For example, the liquid crystal may have varying directions of arrangement of molecules that form the liquid crystal, according to a change in electric field. When an electric field is produced in the liquid crystal layer 25, the liquid crystal molecules 25a of the liquid crystal layer 25 may be arranged along the direction of the electric field, and otherwise when no electric field is produced in the liquid crystal layer 25, the liquid crystal molecules 25a may be arranged irregularly or arranged along the alignment layer. Consequently, the optical property of the liquid crystal layer 25 may be changed according to whether there is an electric field passing the liquid crystal layer 25.

The structure of the display panel 20 as described above in connection with FIG. 3 is merely an example of the display panel according to the disclosure, without being limited thereto.

FIG. 4 is an enlarged view of a light source and a reflector sheet of a display apparatus, according to some embodiments of the disclosure.

Referring to FIG. 4, the display apparatus 1 may include the plurality of light sources 1100 and the light source substrate 1200 on which the light sources 1100 are mounted. The plurality of light sources 1100 and the light source substrate 1200 may constitute a light source module 1000 of the backlight unit 100.

FIG. 4 shows one of the plurality of light sources 1100 included in the light source module 1000, and a structure and function of the light source 1100 as will now be described in connection with FIG. 4 will be commonly applied to each of the plurality of light sources 1100.

The light source 1100 may be arranged to emit light. The light source 1100 may be arranged to emit light toward the display panel 20. The light sources 1100 may employ devices capable of emitting monochromatic light (light having a particular wavelength, e.g., blue light) or white light (mixed light of red light, green light, and blue light) to various directions when powered. For example, the light sources 1100 may include light emitting diodes (LEDs).

The light source substrate 1200 may fix the plurality of light sources 1100 to prevent the light sources 1100 from being moved. In addition, the light source substrate 1200 may supply power to each light source 1100 so that the light source 1100 may emit light.

The light source substrate 1200 may fix the plurality of light sources 1100, and may be formed of a synthetic resin, tapered glass or a PCB with conductive power feed lines formed therein to supply power to the light sources 1100.

The light source 1100 may be arranged on the front surface of the light source substrate 1200. The front surface of the light source substrate 1200 may refer to a surface of the light source substrate 1200 facing the display panel 20. In other words, the light source 1100 may be mounted on the light source substrate 1200 to face the front and arranged to emit light forward.

The reflective sheet 120 may be placed in front of the light source substrate 1200. As described above, the reflective sheet 120 may be coupled to the front surface of the light source substrate 1200. In this case, the reflective sheet 120 may include a plurality of through holes 120a formed at positions respectively matching the plurality of light sources 1100 of the light source module 1000. As shown in FIG. 4, the light source 1100 may pass through the through hole 120a and protrude forward of the reflective sheet 120. Accordingly, the light source 1100 and a portion of the light source substrate 1200 may be exposed forward from the reflective sheet 120 through the through hole 120a. With this structure, the light source 1100 may emit light from the front of the reflective sheet 120.

The reflective sheet 120 may reflect the light emitted toward the reflective sheet 120 from the light source 1100 toward the diffuser plate 130.

The process of the light emitted by the plurality of light sources 1100 and the light reflected by the reflective sheet 120 propagating to the display panel 20 is the same as what is described above.

A detailed structure of the light source 1100 and the light source substrate 1200 will now be described as an example.

The light source 1100 may include a light emitting diode (LED) 1101. The LED 1101 may include a p-type semiconductor and an n-type semiconductor to emit light based on recombination between holes and electrons. Furthermore, the LED 1101 may be equipped with a pair of electrodes to apply holes and electrons to the p-type semiconductor and the n-type semiconductor, respectively.

The LED 1101 may be configured to convert electric energy to light energy. The LED 1101 may emit light having the highest intensity at a predefined wavelength based on the supplied power. For example, the LED 1101 may emit blue light having a peak value at a wavelength that represents blue color (e.g., a wavelength between 450 nm and 495 nm).

For example, a multi-layered reflective structure in which a plurality of insulation films having different refractive indexes are alternately stacked may be provided on the front of the LED 110. For example, the multi-layered reflective structure may be formed of a distributed Bragg reflector (DBR).

For example, the LED 1101 may be attached directly to the light source substrate 1200 in a method of chip on board (COB). In other words, the light source 1100 may include the LED 1101 with an LED chip or an LED die attached directly to the light source substrate 1200 without extra packaging.

The light source module 1000 is manufactured with the LED 1101 of a flip chip type attached to the light source substrate 1200 in the COB method, which makes the light source 1100 compact, The light source the substrate 1200 may include a power feed line 1230 provided to supply power to the light source 1100. The power feed line 1230 may be provided to supply electric signals and/or power from the PBAs 50, 60 and 70 to the light source 1100. For example, the power feed line 1230 may be provided to supply power to the LED 1101 of the flip chip type.

For example, the light source substrate 1200 may be formed by alternately stacking up non-conductive insulation layers and conduction layers.

Lines or patterns in which power and/or electric signals pass may be formed on the conduction layer of the light source substrate 1200. The conduction layer may be formed of various electrically conductive materials. For example, the conduction layer may be formed of various metal substances such as copper (Cu), tin (Sn), aluminum (Al) or an alloy thereof. The power feed line 1230 may be implemented in lines or patterns formed on the conduction layer of the light source substrate 1200.

A dielectric of the insulation layer may insulate gaps between lines or patterns of the conduction layer. The insulation layer may be formed of a dielectric, e.g., FR-4, for electrical insulation.

For example, a protection layer may be arranged on the outer surface of the light source substrate 1200 to prevent or suppress damages to the light source substrate 1200 due to external shocks and/or chemical actions (e.g., corruption) and/or damages due to optical actions. For example, the protection layer of the light source substrate 1200 may include a photo solder resist (PSR).

The power feed line 1230 may be covered by the protection layer of the light source substrate 1200 and prevented from being exposed to the outside.

For example, the light source substrate 1200 may include a power supply pad 1240 electrically connected to the power feed line 1230 to supply power to the LED 1101 of the flip chip type. The power feed line 1230 may be electrically connected to the LED 1101 through the power feed pad 1240.

For example, a window may be formed on the protection layer of the light source substrate 1230 to expose a portion of the power feed line 1230 to the outside. The power supply pad 1240 may be electrically connected to the portion of the power feed line 1230 exposed to the outside of the light source substrate 1200.

For example, various conductive adhesives having electrical conductivity such as solder, electrically conductive epoxy adhesives, etc., may be applied between the electrode of the LED 1101 and the power supply pad 1240.

The light source 1100 may include an optical dome 1102. The optical dome 1102 may cover the LED 1101. The optical dome 1102 may prevent or suppress damage to the LED 1101 due to an external mechanical action and/or chemical action.

The optical dome 1102 may be shaped like, for example, a dome obtained by cutting a sphere without including the center or a semi-sphere obtained by cutting the sphere with the center included. A vertical cross-section of the optical dome 1102 may have e.g., an arcuate form or a semi-circular form.

The optical dome 1102 may be formed of silicon or epoxy resin. For example, melted silicon or epoxy resin is discharged onto the LED 1101 through e.g., a nozzle, and then hardened to form the optical dome 1102.

The optical dome 1102 may be optically transparent or translucent. Light emitted from the LED 1101 may pass through the optical dome 1102 to the outside.

In this case, for example, the dome-shaped optical dome 1102 may refract light like a lens. For example, the light emitted from the LED 1101 may be refracted and dispersed by the optical dome 1102.

The structure of the light source module 1000 with the light source 1100 and the light source substrate 1200 as described above in connection with FIG. 4 is merely an example of a light source module of the display apparatus according to the disclosure, without being limited thereto.

Figure 5:
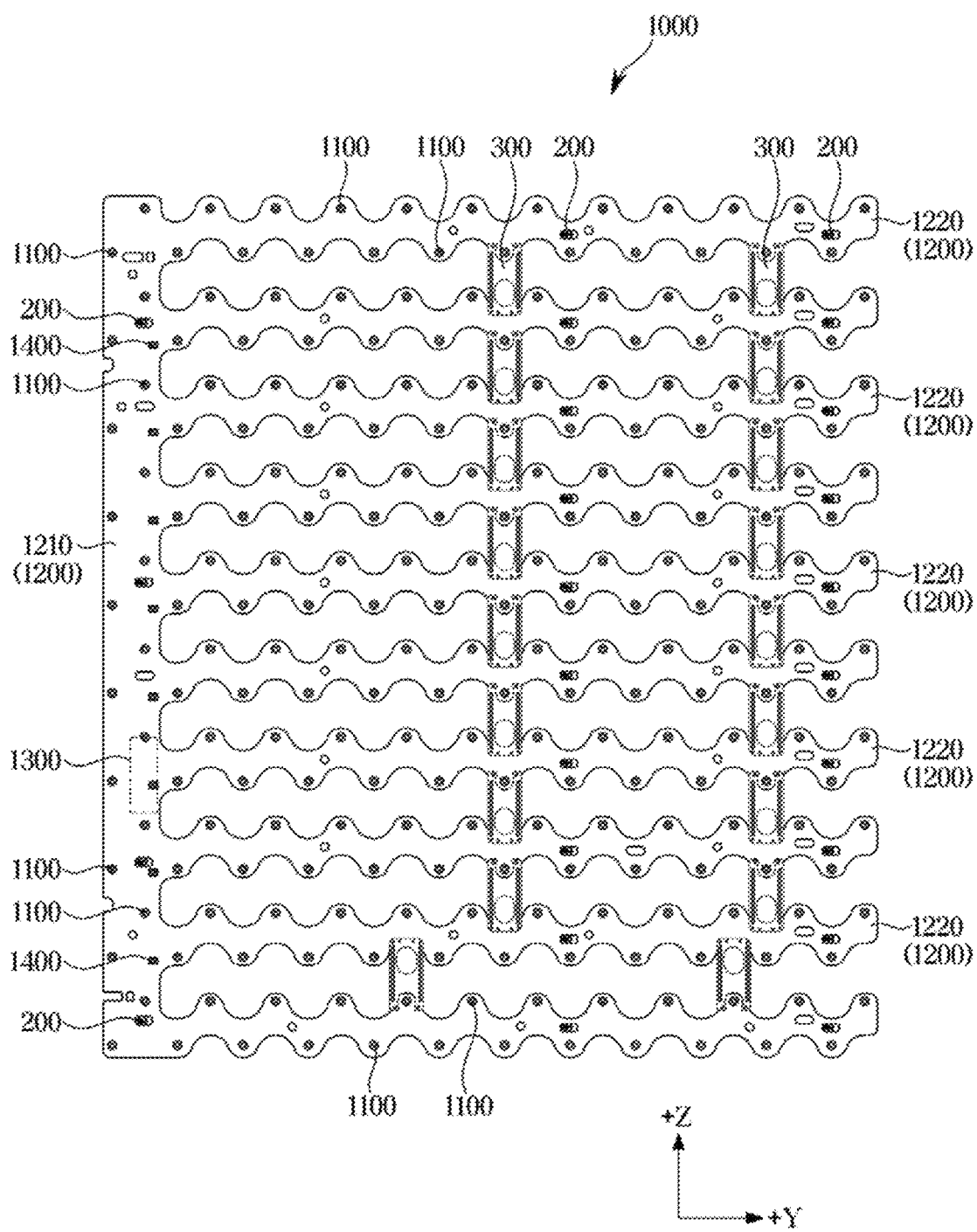
FIG. 5 illustrates a light source substrate of a display apparatus according to some embodiments of the disclosure.

FIG. 5 illustrates a light source substrate of a display apparatus, according to some embodiments of the disclosure.

Referring to FIG. 5, in some embodiments of the disclosure, the display apparatus 1 may include the light source module 1000. The display apparatus 1 may include a plurality of light source modules 1000, and descriptions for the structure and properties of one light source module 1000 as will now be described in connection with FIG. 5 will be equally applied to each of the plurality of light source modules 1000.

The light source module 1000 may include a plurality of light sources 1100 and a light source substrate 1200 on which the plurality of light sources 1100 are mounted. The light source substrate 1200 may support the plurality of light sources 1100. The light source substrate 1200 may include the power feed line 1230 provided to deliver a driving current to the plurality of light sources 1100.

The light source substrate 1200 may be placed in front of the bottom chassis 15 (in the direction +X). The light source substrate 1200 may be mounted on the bottom chassis 15. The light source substrate 1200 may be secured by the bottom chassis 15 and supported by the bottom chassis 15.

The light source substrate 1200 may include a plurality of substrate bars 1220.

The substrate bars 1220 are a component that constitutes at least a portion of the aforementioned light source substrate 1200, including a PCB having a shape extending in one direction.

At least some of the plurality of light sources 1100 may be mounted on each of the plurality of substrate bars 1220. The at least some of the plurality of light sources 1100 may be mounted on the front surface of the plurality of substrate bars 1220. The front surface of the plurality of substrate bars 1220 refers to a surface of the plurality of substrate bars 1220 directed to the display panel 20.

The plurality of substrate bars 1220 may be formed of a PCB on which the light sources 1100 are mounted and the aforementioned power feed line 1230 is arranged.

The plurality of substrate bars 1220 may be arranged along a first direction Z. For example, the plurality of substrate bars 1220 may be arranged in almost the vertical direction of the display apparatus 1.

The plurality of substrate bars 1220 may be arranged to be spaced from one another. The plurality of substrate bars 1220 may be arranged to be spaced from one another along the first direction Z. For example, the first direction Z in which the plurality of substrate bars 1220 are arranged to be spaced from one another may be parallel to almost the vertical direction (up-down direction) of the display apparatus 1. The plurality of substrate bars 1220 may be arranged to be parallel to one another at spaced positions.

The plurality of substrate bars 1220 may each be shaped like a bar. Specifically, each of the plurality of substrate bars 1220 may have the width in the first direction Z and extend long in a second direction Y different from the first direction Z. In other words, each of the plurality of substrate bars 1220 may be formed to have a longer length in the second direction Y than the width in the first direction Z. The second direction Y may also be referred to as a bar direction in which each of the plurality of substrate bars 1220 extends.

For example, the direction of the width of each of the plurality of substrate bars 1220 may be parallel to almost the vertical direction (up-down direction) of the display apparatus 1. For example, the direction in which each of the plurality of substrate bars 1220 extends may be parallel to almost the horizontal direction (e.g., left-right direction).

For example, the direction in which each of the plurality of substrate bars 1220 extends may be parallel to a direction of the long side of the display apparatus 1. For example, the direction of the width of each of the plurality of substrate bars 1220 may be parallel to a direction of the short side of the display apparatus 1. Specifically, the plurality of substrate bars 1220 may be arranged along the direction of the short side of the display apparatus 1, and may extend in the direction of the long side of the display apparatus 1.

The direction in which the plurality of substrate bars 1220 are arranged to be spaced from one another may be parallel to the direction of each width. In other words, the plurality of substrate bars 1220 may be arranged to be spaced from one another along the first direction Z, which is the direction of each width.

Each of the plurality of substrate bars 1220 may extend in a different direction from the direction in which the plurality of substrate bars 1220 are spaced from one another. Specifically, each of the plurality of substrate bars 1220 may extend in the direction Y that is perpendicular to the direction Z in which the plurality of substrate bars 1220 are spaced from one another. That is, the first and second directions may be perpendicular to each other.

Alternatively, the direction in which the plurality of substrate bars 1220 are arranged to be spaced from one another and the direction in which each of the plurality of substrate bars 1220 extends may form a certain angle, which may not be exactly the right angle.

For example, the plurality of substrate bars 1220 may be arranged to be spaced at regular intervals in the first direction Z. In other words, the distances in the first direction Z between pairs of neighboring substrate bars 1220 among the plurality of substrate bars 1220 may be almost the same. This may increase uniformity of brightness of the display apparatus 1.

For example, the plurality of substrate bars 1220 may be formed to have a shape corresponding to one another. For example, the plurality of substrate bars 1220 may have corresponding width in the first direction Z. For example, the plurality of substrate bars 1220 may have corresponding length that extends in the second direction Y. For example, the plurality of substrate bars 1220 may be formed to have corresponding sizes.

Each of the plurality of substrate bars 1220 may be mounted on the bottom chassis 15. As each of the plurality of substrate bars 1220 is mounted on the bottom chassis 15 and remains in a fixed position, the plurality of light sources 1100 mounted on the plurality of substrate bars 1220 may be stably placed in the respectively designed positions. For example, each of the plurality of substrate bars 1220 may be mounted on the bottom chassis 15 through a board fixer 200 for fixing the light source substrate 1200 to the bottom chassis 15.

The plurality of substrate bars 1220 may also be supported more stably by bar supporters 300. For example, the bar supporters 300 may each be coupled to a pair of neighboring substrate bars 1220, so that the pairs of substrate bars 1220 may be arranged to be more stably supported.

The structure in which the plurality of substrate bars 1220 are mounted or stably supported on the bottom chassis 15 is not, however, limited to the above structure (with the substrate fixers 200, the bar supporters 300, etc.).

The reflective sheet 120 may be attached to the front surface of each of the plurality of substrate bars 1220.

The light source substrate 1200 may include a substrate body 1210. The substrate body 1210 is a component that forms a portion of the aforementioned light source substrate 1200, which may include a PCB.

The plurality of substrate bars 1220 may be connected to the substrate body 1210. The plurality of substrate bars 1220 may be supported by the substrate body 1210. For example, the plurality of substrate bars 1220 may be connected to one side of the substrate body 1210.

The plurality of substrate bars 1220 may extend from the substrate body 1210. For example, each of the plurality of substrate bars 1220 may extend from the substrate body 1210 in the second direction Y. For example, each of the plurality of substrate bars 1220 may extend from the one side of the substrate body 1210 in the second direction Y. Each of the plurality of substrate bars 1220 may extend from the substrate body 1210 in the bar direction.

The substrate body 1210 may extend in the first direction Z. For example, the substrate body 1210 may be formed to have a longer length in the first direction Z than the width in the second direction Y. As the substrate body 1210 extends in the direction in which the plurality of substrate bars 1220 are arranged, the substrate body 1210 may have a structure connected to more substrate bars 1220. Furthermore, in this case, as the plurality of substrate bars 1220 extend from one side of the second direction Y, which is the direction of width (i.e., the direction of a relatively short length) of the substrate body 1210, each of the plurality of substrate bars 1220 may have a form that extends longer from the substrate body 1210.

The substrate body 1210 may be mounted on the bottom chassis 15. As the substrate body 1210 is mounted on the bottom chassis 15 and remains in a fixed position, the plurality of light sources 1100 mounted on the substrate body 1210 may be stably placed in the respectively designed positions. Also, as the substrate body 1210 is mounted on the bottom chassis 15, the plurality of substrate bars 1220 connected to the substrate body 1210 may be supported more stably by the substrate body 1210.

For example, the substrate body 1210 may be mounted on the bottom chassis 15 through the substrate fixer 200 for fixing the light source substrate 1200 to the bottom chassis 15. The structure in which the substrate body 1210 is mounted or stably supported on the bottom chassis 15 is not, however, limited to the above structure (with the substrate fixer 200, etc.).

For example, some of the plurality of light sources 1100 may be mounted on the substrate body 1210. Some of the plurality of light sources 1100 may be mounted on the front surface of the substrate body 1210. The front surface of the substrate body 1210 refers to one side of the substrate body 1210 in a direction in which the substrate body 1210 is directed to the display panel 20.

The substrate body 1210 may be formed of a PCB on which the light sources 1100 are mounted and the aforementioned power feed line 1230 is arranged.

The reflective sheet 120 may be attached to the front surface of the substrate body 1210. For example, the reflective sheet 120 in one body may be attached to the front surfaces of the substrate body 1210 and the plurality of substrate bars 1220. In this case, uniformity of brightness from the light reflected by the reflective sheet 120 may be enhanced, and a process of attaching the reflective sheet 120 to the front surfaces of the substrate body 1210 and the plurality of substrate bars 1220 may be streamlined. It is not, however limited thereto, and a plurality of reflective sheets 120 separated from one another may be attached to the front surfaces of the substrate body 1210 and the plurality of substrate bars 1220.

For example, as shown in FIG. 5, the substrate body 1210 and the plurality of substrate bars 1220 may be integrally formed. In other words, the substrate body 1210 and the plurality of substrate bars 1220 may be connected to each other to constitute the integral light source substrate 1200. The light source substrate 1200 may be formed of an integral PCB including the substrate body 1210 and the plurality of substrate bars 1220. Alternatively, the substrate body 1210 and the plurality of substrate bars 1220 are not integrally formed but separate parts which may be connected to each other through an assembling procedure.

Although each of the plurality of substrate bars 1220 extends to the right (in the direction +Y) from the substrate body 1210 in the embodiment of the disclosure as shown in FIG. 5, the disclosure is not limited thereto, and for example, the plurality of substrate bars 1220 may extend to the left (in the direction −Y) from the substrate body 1210.

Furthermore, the substrate body 1210 extends in the vertical direction (in the direction Z) of the display apparatus 1 in the embodiment of the disclosure as shown in FIG. 5, but the disclosure is not limited thereto, and for example, the substrate body 1210 may extend horizontally (in the direction Y).

Moreover, each of the plurality of substrate bars 1220 extends horizontally (in the direction Y) from one side of the horizontal direction Y of the substrate body 1210 in the embodiment of the disclosure as shown in FIG. 5, the disclosure is not limited thereto, and for example, each of the plurality of substrate bars 1220 may extend vertically (in the direction Z) from one side of the vertical direction Z of the substrate body 1210. In this case, the plurality of substrate bars 1220 may be arranged to be spaced from one another in the horizontal direction Y.

Unlike what is described above, the first direction that is a direction of width of each of the plurality of substrate bars 1220, the first direction in which the plurality of substrate bars 1220 are arranged to be spaced from one another, the first direction in which the substrate body 1210 extends, the second direction in which each of the plurality of substrate bars 1220 extends or the like may not be parallel to any of the vertical direction Z or the horizontal direction Y of the display apparatus 1.

However, for convenience of explanation, descriptions will now be focused on an embodiment where the first direction is parallel to the vertical direction Z of the display apparatus 1 and the second direction is parallel to the horizontal direction Y of the display apparatus 1.

The display apparatus 1 may include a connector 1300 arranged on the light source substrate 1200. The connector 1300 may be electrically connected to the plurality of light sources 1100. The connector 1300 may be electrically connected to the light source substrate 1200. The connector 1300 may be electrically connected to various electronic parts mounted on the light source substrate 1200 such as the plurality of light sources 1100 via the power feed line 1230 arranged on the light source substrate 1200. Also, the connector 1300 may be arranged to be electrically connected to the driving board 70 through an electric wire C (see FIG. 7). Accordingly, the connector 1300 may deliver a driving signal transmitted from the driving board 70 to the various electronic parts mounted on the light source substrate 1200 such as the plurality of light sources 1100. In other words, the light source module 1000 may be electrically connected to the driving board 70 through the connector 1300, and may receive a driving current from the driving board 70 through the connector 1300.

For example, the connector 1300 may be mounted on the substrate body 1210. Specifically, the connector 1300 may be mounted on the rear surface of the substrate body 1210. The rear surface of the substrate body 1210 refers to one surface of the substrate body 1210 facing the bottom chassis 15. The rear surface of the substrate body 1210 also refers to an opposite surface to the front surface of the substrate body 1210 which is directed to the display panel 20 and on which the plurality of light sources 1100 are mounted.

As shown in FIG. 5, for example, the connector 1300 may be arranged in a position near a center of the substrate body 1210. Specifically, the connector 1300 may be arranged in a position near the center of the substrate body 1210 in the first direction Z. The expression "the connector 1300 being arranged in a position near the center of the substrate body 1210 in the first direction Z" does not exactly mean that the connector 1300 is placed where the distance to one end (e.g., upper end) of the substrate body 1210 in the first direction Z is equal to the distance to the other end (e.g., the lower end). With this structure of the connector 1300, even when the substrate bars 1220 are arranged on any side to the substrate body 1210 of the light source substrate 1200, the position of the connector 1300 in the first direction Z (i.e., the height of the connector 1300 in the vertical direction of the display apparatus 1) does not significantly change, thereby improving efficiency of product design and manufacturing tasks.

The connector 1300 will be described in more detail later.

The display apparatus 1 may include a plurality of driving devices 1400 mounted on the light source substrate 1200. The plurality of driving devices 1400 may be provided to control at least some of the plurality of light sources 1100, which are mounted on the same light source substrate 1200.

The plurality of driving devices 1400 may be mounted on the light source substrate 1200 and electrically connected to the power feed line 1230. The plurality of driving devices 1400 may be electrically connected to the driving board 70 through such components as the power feed line 1230 and the connector 1300.

For example, the plurality of light sources 1100 may be divided into multiple dimming blocks each including at least one light source 1100, and the plurality of driving devices 1400 may output a dimming signal to control the plurality of dimming blocks.

For example, the plurality of driving devices 1400 may be implemented with pixel integrated circuits (ICs) or active matrix integrated circuits (AM ICs).

For example, as shown in FIG. 5, the plurality of driving devices 1400 may be mounted on the front surface of the substrate body 1210. The front surface of the substrate body 1210 refers to one surface of the substrate body 1210 facing the display panel 20. Alternatively, the plurality of driving devices 1400 may be mounted on the rear surface of the substrate body 1210. The rear surface of the substrate body 1210 refers to an opposite surface to the front surface of the substrate body 1210 facing the bottom chassis 15.

For example, the plurality of driving devices 1400 may be arranged side by side in the first direction Z. In other words, the plurality of driving devices 1400 may be arranged side by side in the vertical direction of the display apparatus 1. Without being limited thereto, the plurality of driving devices 1400 may be arranged variously.

Figure 6:
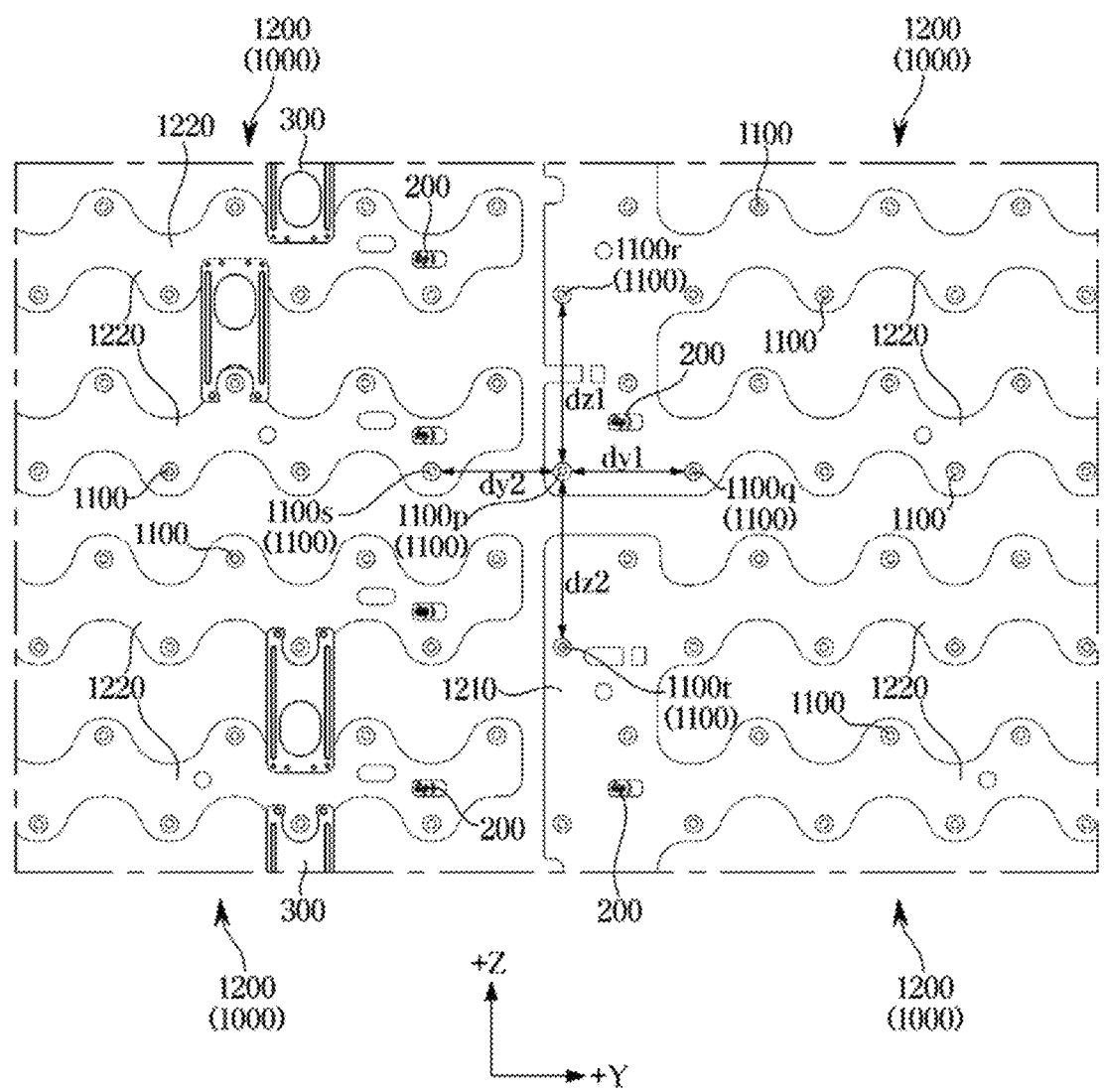
FIG. 6 is an enlarged view of some neighboring light source substrates among light source substrates of a display apparatus according to some embodiments of the disclosure.

FIG. 6 is an enlarged view of some neighboring light source substrates among light source substrates of a display apparatus, according to some embodiments of the disclosure.

Referring to FIG. 6, in some embodiments of the disclosure, the display apparatus 1 may include the plurality of light source modules 1000. The display apparatus 1 may include the plurality of light sources 1100 and the plurality of light source substrates 1200 each having the plurality of light sources 1100 mounted thereon.

For example, the plurality of light source modules 1000 may be formed to have corresponding forms. In other words, the plurality of light source modules 1000 may have almost the same structure. As the plurality of light source modules 1000 are designed to have almost the same structure, a waste of parts may be prevented and efficiency of manufacturing processes may be improved, thereby saving the production costs or manufacturing costs. Without being limited thereto, at least some of the plurality of light source modules 1000 may be formed to have different forms.

For example, some of the plurality of light source modules 1000 may be arranged side by side in the first direction Z and the others of the plurality of light source modules 1000 may be arranged side by side in the second direction Y. In other words, the plurality of light source modules 1000 may be arranged in columns extending in the first direction Z and rows extending in the second direction Y. As shown in FIG. 6, the plurality of light source modules 1000 may be arranged in rows extending in the horizontal direction Y and in columns extending in the vertical direction Z.

The plurality of light source modules 1000 may be provided so that the plurality of light sources 1100 are arranged at regular intervals. The plurality of light sources 1100 may be arranged at regular intervals in the vertical direction Z and arranged at regular intervals in the horizontal direction Y.

For example, referring to FIG. 6, a distance dy1 between a pair of neighboring light sources 1100p and 1100q on one light source substrate 1200 in the horizontal direction Y among the plurality of light sources 1100 (hereinafter, referred to as a first horizontal distance) may be constant. The first horizontal distance may refer to the shortest distance between a pair of light sources 1100 in the horizontal direction Y among the plurality of light sources 1100 mounted on one light source substrate 1200, and the first horizontal distance dy1 between the pair of neighboring light sources 1100 on the one light source substrate 1200 in the horizontal direction Y may be constant.

Referring to FIG. 6, a distance dy2 between the light source 1100p among the plurality of light sources 1100 included in one light source module 1000 and a light source 1100s arranged nearest to the light source 1100p in the horizontal direction Y among the plurality of light sources 1200 included in another light source module 10000 (hereinafter, referred to as a second horizontal distance) may be constant. The second horizontal distance dy2 may be equal to the first horizontal distance dy1. In other words, a pair of neighboring light source substrates 1200 in the horizontal direction Y may be arranged so that the first horizontal distance dy1 and the second horizontal distance dy2 of the plurality of light sources 1100 mounted thereon are the same.

Furthermore, referring to FIG. 6, a distance dz1 between a pair of neighboring light sources 1100p and 1100r on one light source substrate 1200 in the vertical direction Z among the plurality of light sources 1100 (hereinafter, referred to as a first vertical distance) may be constant. The first vertical distance may refer to the shortest distance between a pair of light sources 1100 in the vertical direction Z among the plurality of light sources 1100 mounted on one light source substrate 1200, and the first vertical distance dz1 between the pair of neighboring light sources 1100 on the one light source substrate 1200 in the vertical direction Z may be constant.

Referring to FIG. 6, a distance dz2 between the light source 1100p among the plurality of light sources 1100 included in one light source module 1000 and a light source 1100t arranged nearest to the light source 1100p in the vertical direction Z among the plurality of light sources 1100 included in another light source module 1000 (hereinafter, referred to as a second vertical distance) may be constant. The second vertical distance dz2 may be equal to the first vertical distance dz1. In other words, a pair of neighboring light source substrates 1200 in the vertical direction Z may be arranged so that the first vertical distance dz1 and the second vertical distance dz2 of the plurality of light sources 1100 mounted on the pair of light source substrates 1200 are the same.

Furthermore, the first horizontal distance dy1, the second horizontal distance dy2, the first vertical distance dz1 and the second vertical distance dz2 may all be set to be the same.

The aforementioned layouts of the light source modules 1000 may be applied to layouts of the plurality of neighboring light source modules 1000 in the horizontal direction Y or the vertical direction Z. With the layout and structure of the light source modules 1000, the plurality of light sources 1100 may be arranged at regular intervals in the horizontal direction Y and the vertical direction Z, and accordingly, the display apparatus 1 may provide uniform brightness.

As will be described later, the light source substrate 1200 may be arranged such that the substrate body 1210 is located farther to the left (in the direction −Y) or right (in the direction +Y) than the plurality of substrate bars 1220 are, as needed. In this case, with the layout and structure of the light source module 1000 having the first horizontal distance dy1, the second horizontal distance dy2, the first vertical distance dz1 and the second vertical distance dz2 being constant, the plurality of light sources 1100 may be arranged at regular intervals without being affected by the layout of the light source substrate 1200, i.e., in which direction the substrate body 1210 is located to the plurality of substrate bars 1220.

Figure 7:
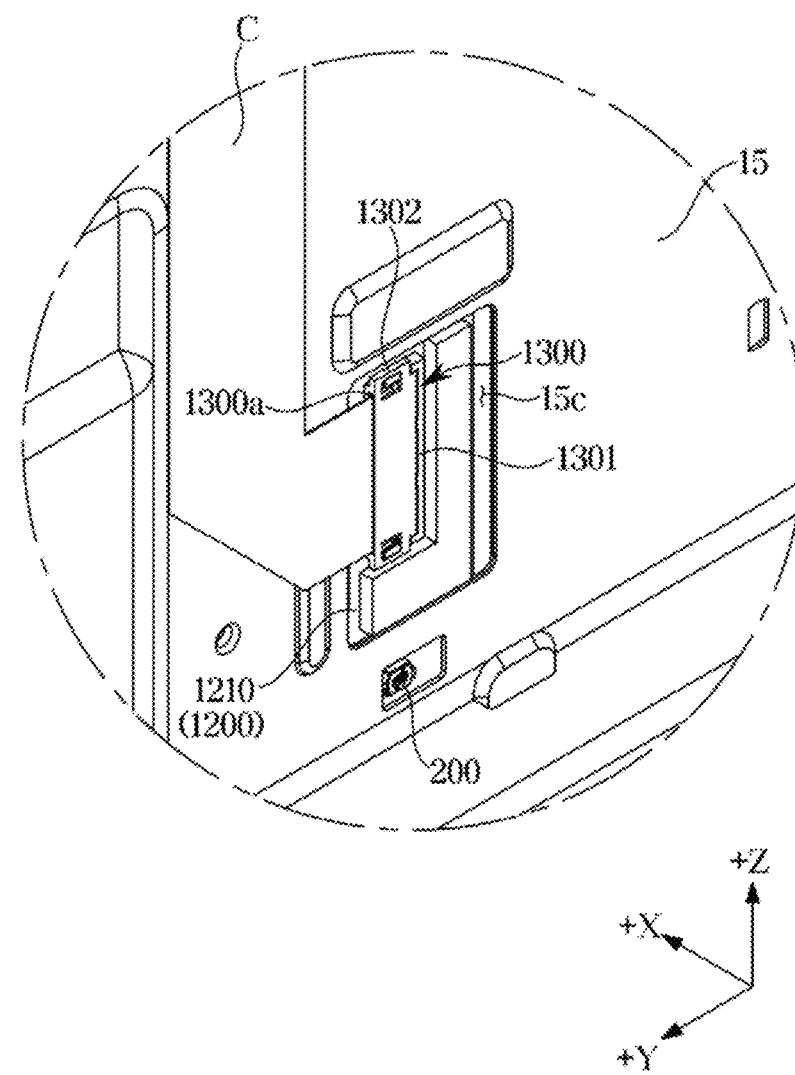
FIG. 7 illustrates a connector, an electric wire connected thereto, and a portion of a bottom chassis of a display apparatus according to some embodiments of the disclosure.

FIG. 7 illustrates a connector, an electric wire connected thereto, and a portion of a bottom chassis of a display apparatus, according to some embodiments of the disclosure.

Figure 8:
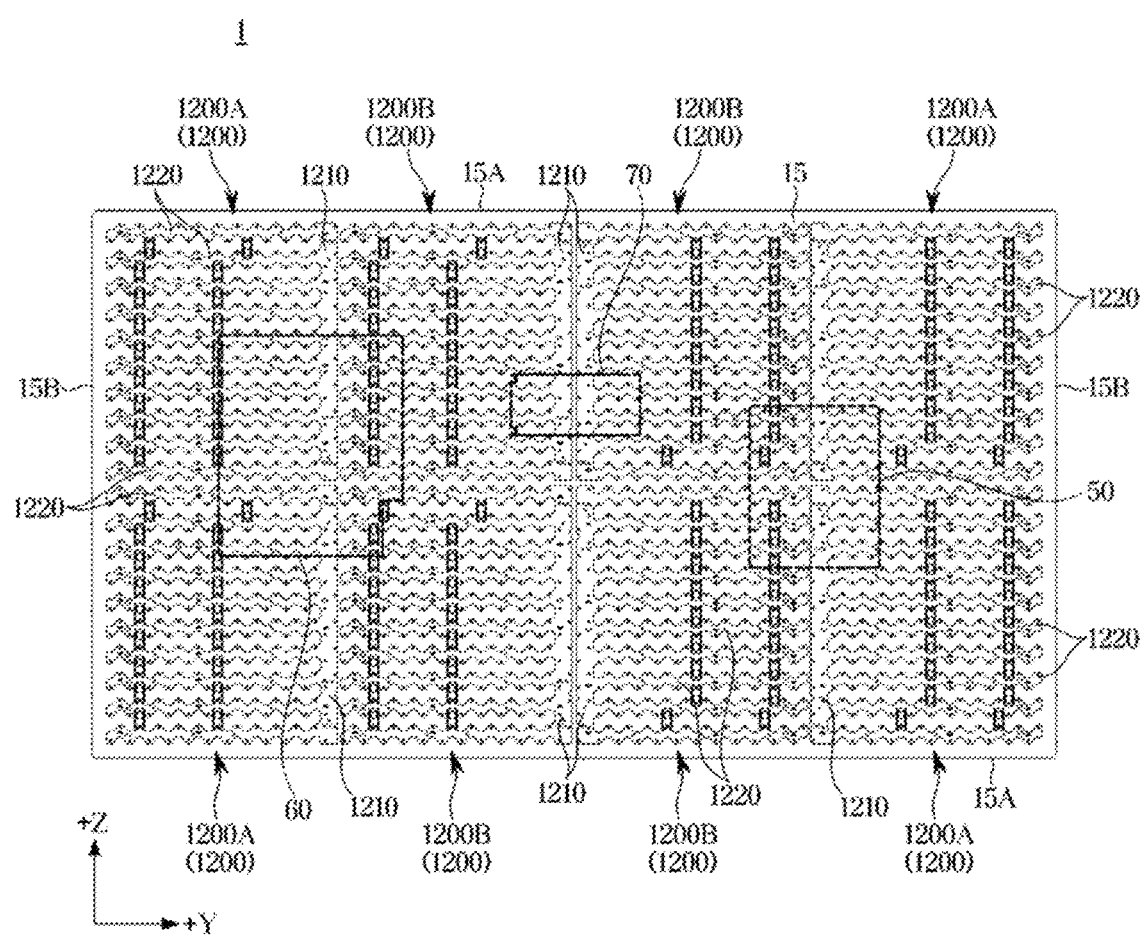
FIG. 8 is a front view of light source substrates and a bottom chassis of a display apparatus according to some embodiments of the disclosure.
Figure 9:
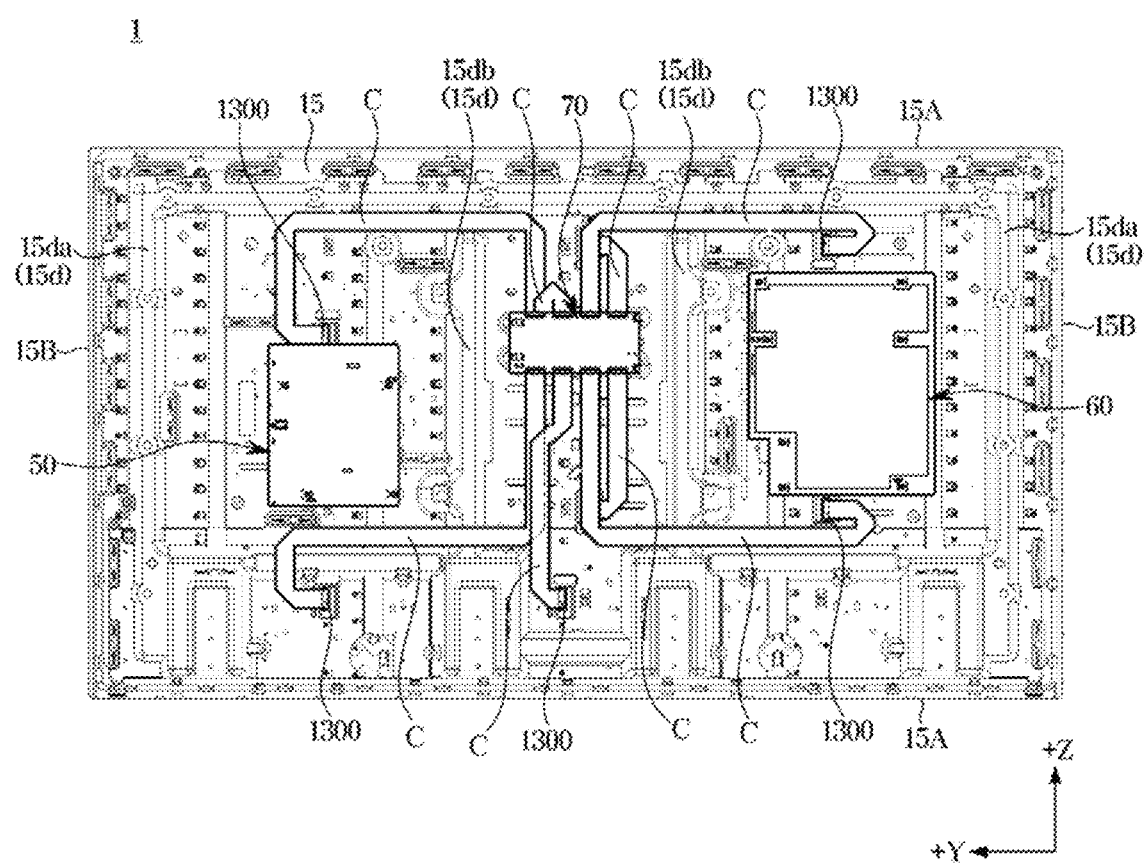
FIG. 9 is a rear view of printed circuit board assemblies (PBAs) and a bottom chassis of a display apparatus according to some embodiments of the disclosure.

Referring to FIG. 7, in the display apparatus 1, the plurality of light source substrates 1200 may be electrically connected to at least some of the PBAs 50, 60 and 70 via the electric wire C. Specifically, as shown in FIGS. 8 and 9, each of the plurality of light source substrate 1200 may be electrically connected to the driving board 70 via the electric wire C. Each of the plurality of light source substrates 1200 may be connected to the electric wire C electrically connected to the driving board 70. Each of the plurality of light source substrates 1200 may receive a driving signal from the driving board 70 through the electric wire C.

For example, the electric wire C may include a flexible flat cable or a film cable.

As described above, the light source substrate 1200 may be arranged in front of the bottom chassis 15 while the driving board 70 may be arranged behind the bottom chassis 15. The electric wire C connected to the driving board 70 may be arranged behind the bottom chassis 15.

The display apparatus 1 may include a plurality of connectors 1300 arranged on the plurality of light source substrates 1200. At least one connector 1300 may be arranged on one light source substrate 1200. One or more of the plurality of connectors 1300 may be arranged on the substrate body 1210 of each of the plurality of light source substrates 1200.

Each of the plurality of connectors 1300 may be connected to the electric wire C. Each of the plurality of connectors 1300 may be electrically connected to the driving board 70 via the electric wire C. Each of the plurality of connectors 1300 may be connected to the electric wire C for each of the plurality of light source substrates 1200 to be electrically connected to the driving board 70. The light source substrate 1200 may be electrically connected to the driving board 70 as the connector 1300 mounted thereon is connected to the electric wire C.

As described above, each of the plurality of connectors 1300 may be arranged on the rear surface of the light source substrate 1200. Specifically, the plurality of connectors 1300 may be arranged on the rear surface of the substrate body 1210.

In this case, the plurality of connectors 1300 may each be arranged to pass through the bottom chassis 15. The bottom chassis 15 may include a connector hole 15c, and the connector 1300 may be arranged to pass through the connector hole 15c. The connector 1300 may pass through the connector hole 15c and may thus be connected to the electric wire C arranged behind the bottom chassis 15. There may be a plurality of connector holes 15c, which may be arranged to match the respective positions of the plurality of connectors 1300. For example, the connector hole 15c may have the form of a hole of the bottom chassis 15 bored through in a front-back direction X.

For example, the connector 1300 may be mounted on the substrate body 1210 as a part separated from the substrate body 1210. Alternatively, the connector 1300 may be integrally formed with the substrate body 1210.

For example, the connector 1300 may be formed to have long sides 1301 and short sides 1302 that are shorter than the long sides 1301. For example, the long sides 1301 and the short sides 1302 of the connector 1300 may be perpendicular to each other, but are not limited thereto.

In this case, the long sides 1301 of the connector 1300 may be parallel to the first direction Z. Specifically, the connector 1300 may be arranged so that the long sides 1301 are parallel to the first direction Z. In other words, the connector 1300 may be arranged to be longer in the first direction Z than in the second direction Y, and may extend long in the first direction Z. The connector 1300 may be arranged so that the long sides 1301 are parallel to the first direction Z, a direction of the length of the substrate body 1210. The connector 1300 may be arranged so that the long sides 1301 are substantially perpendicular to the second direction, a direction in which the substrate bars 1220 extend. The connector 1300 may be arranged so that the long sides 1301 are parallel to the first direction Z, a direction in which the plurality of substrate bars 1220 are arranged.

Unlike what is shown in FIG. 7, assuming that the short sides 1302 of the connector 1300 are parallel to the first direction Z, the connector 1300 may be arranged so that the long sides 1301 are parallel to the second direction Y, so the substrate body 1210 having the connector 1300 mounted thereon may be required to be longer in the second direction Y than in the case as shown in FIG. 7. In this case, more materials may be required to produce the substrate body 1210, which may lead to an increase of production costs.

On the other hand, as shown in FIG. 7, as the long sides 1301 of the connector 1300 are parallel to the first direction Z, less materials may be required to produce the substrate body 1210 and the production costs may be saved.

For example, the electric wire C connected to the driving board 70 may be arranged to be electrically connected to the connector 1300 through a connection terminal 1300a provided on the long side 1301 of the connector 1300. Furthermore, for example, the power feed line 1230 of the light source substrate 1200 may be arranged to be electrically connected to the connector 1300 through the connection terminal 1300a provided on the long side 1301 of the connector 1300.

In some embodiments, in each of the plurality of light source modules 1000, the connector 1200 may be arranged so that the connection terminals 1300a are located in the same direction to the light source substrate 1200.

For example, referring to FIGS. 8 and 9, in each of the plurality of light source modules 1000, the connector 1300 may be arranged so that the connection terminal 1300a is directed to a direction in which the substrate bars 1220 are located with respect to the substrate body 1210.

As such, the plurality of light source modules 1000 may all have the same structure, thereby saving the production costs of the parts and improving manufacturing efficiency of the product.

FIG. 8 is a front view of light source substrates and a bottom chassis of a display apparatus, according to an embodiment of the disclosure. FIG. 9 is a rear view of PBAs and a bottom chassis of a display apparatus, according to an embodiment of the disclosure.

Referring to FIGS. 8 and 9, the display apparatus 1 may include the plurality of light source substrates 1200 having the plurality of light sources 1100 mounted thereon, and the driving board 70 arranged to control operation of each of the plurality of light sources 1100. For example, as shown in FIGS. 8 and 9, the driving board 70 may be placed in substantially the center of the display apparatus 1 in the second direction Y. In other words, the driving board 70 may be arranged in substantially the center of the bottom chassis 15.

The driving board 70 may be electrically connected to each of the plurality of light source substrates 1200 to control operation of the light sources 1100 mounted thereon. Each of the plurality of light source substrates 1200 may be electrically connected to the driving board 70 via the electric wire C. The electric wire C may be provided in the plural, making each of the plurality of light source substrates 1200 connected to the driving board 70.

The driving board 70 may include a plurality of connection ports arranged for the plurality of electric wires C to connect thereto. One electric wire C may connect to one connection port arranged on the driving board 70, and connect to one connector 1300 arranged on one of the plurality of light source substrates 1200. With this, the driving board 70 and each of the plurality of light source substrates 1200 may be electrically connected via the electric wire C, and a driving current from the driving board 70 may be sent to each light source substrate 1200 through the electric wire C. The electric wire C may extend from the connection port of the driving board 70 to the connector 1300 arranged on the light source substrate 1200.

As described above, the connector 1300 may be arranged on the substrate body 1210 of the light source substrate 1200. Specifically, the connector 1300 may be mounted on the rear surface of the substrate body 1210. The rear surface of the substrate body 1210 refers to a surface of the substrate body 1210 that is opposite to the front surface of the substrate body 1210 facing the display panel 20 and that faces the bottom chassis. As shown in FIG. 7, the connector 1300 may be arranged to pass through the connector hole 15c of the bottom chassis 15 to be connected to the electric wire C arranged behind the bottom chassis 15. Alternatively, the connector 1300 may not pass through the bottom chassis 15, but instead, the electric wire C may bore through the bottom chassis 15 to access the connector 1300 from the front of the bottom chassis 15.

In this case, the position of the connector 1300 may vary by the direction in which the light source substrate 1200 is installed on the bottom chassis 15.

As described above, the light source substrate 1200 may be arranged so that the substrate body 1210 is located to the left (in the direction −Y) of the substrate bars 1220 (e.g., four light source substrates 1200 in two right columns in FIG. 8), in which case, the connector 1300 may be located on the left to the substrate bars 1220. In this case, as the substrate body 1210 has short width in the horizontal direction Y but the substrate bars 1220 are elongated in the horizontal direction Y, the connector 1300 may be lopsided to the left on the light source substrate 1200.

Alternatively, the light source substrate 1200 may be arranged so that the substrate body 1210 is located to the right (in the direction +Y) of the substrate bars 1220 (e.g., four light source substrates 1200 in two left columns in FIG. 8), in which case, the connector 1300 may be located on the right to the substrate bars 1220. In this case, as the substrate body 1210 has short width in the horizontal direction Y but the substrate bars 1220 are elongated in the horizontal direction Y, the connector 1300 may be lopsided to the right on the light source substrate 1200.

As such, depending on in which direction the substrate body 1210 is located with respect to the substrate bar 1220, the direction in which the connector 1300 is arranged based on the center of the light source substrate 1200 may change, which may lead to a change in distance between the driving board 70 and the connector 1300. In other words, depending on the direction in which the light source substrate 1200 is installed, the length of extension of the electric wire C that connects the connection port of the driving board 70 to the connector 1300 may change.

When the length of extension of the electric wire C increases with an increase of the distance between the driving board 70 and the connector 1300, noise may increase due to the current flowing in the electric wire C, which is likely to lead to deterioration of quality of the product. Furthermore, when the length of extension of the electric wire C increases, there may be more design factors to be taken into account to arrange the electric wire C not to interfere with other pars in the display apparatus 1, it may not be easy to efficiently design the product, so the production efficiency may be lowered. When the length of extension of the electric wire C increases unnecessarily, the production costs may increase as well.

Hence, in some embodiments, at least some of the plurality of light source substrates 1200 may be arranged so that the substrate body 1210 is farther away from borders 15A and 15B of the bottom chassis 15 than the plurality of substrate bars 1220 are. Also, at least some of the plurality of light source substrates 1200 may be arranged so that the substrate body 1210 is nearer to the driving board 70 than the plurality of substrate bars 1220 are.

As shown, the bottom chassis 15 may include the horizontal borders 15A extending in the second direction Y (i.e., horizontal direction of the display apparatus 1) and the vertical borders 15B extending in the first direction Z (i.e., vertical direction of the display apparatus 1). The horizontal borders 15A of the bottom chassis 15 may be provided in one pair. The vertical borders 15B of the bottom chassis 15 may be provided in one pair. For example, the bottom chassis 15 may have substantially a rectangular shape with the pair of horizontal borders 15A and the pair of vertical borders 15B.

Specifically, at least some of the plurality of light source substrates 1200 may be arranged so that the substrate body 1210 is farther away from the border 15A or 15B of the bottom chassis 15 in the second direction Y than the plurality of substrate bars 1220 are. The borders 15A and 15B of the bottom chassis 15 may include the pair of horizontal borders 15A extending in the horizontal direction Y and the pair of vertical borders 15B extending in the vertical direction Z, and at least some of the plurality of light source substrates 1200 may be arranged so that the distance between the substrate body 1210 and the vertical border 15B is longer than the distance between the plurality of substrate bars 1220 and the vertical border 15B. That is, some light source substrates 1200A arranged adjacent to the vertical border 15B of the bottom chassis 15 among the plurality of light source substrates 1200 may be arranged so that the substrate body 1210 is farther away from the vertical border 15B of the bottom chassis 15 in the second direction Y (i.e., the horizontal direction) than the plurality of substrate bars 1220 are.

In other words, at least some of the plurality of light source substrates 1200 may be arranged so that the substrate body 1210 is farther away from the border of the display case in the second direction Y than the plurality of substrate bars 1220 are.

In other words, at least some of the plurality of light source substrates 1200 may be arranged so that the substrate body 1210 is nearer to the driving board 70 than the plurality of substrate bars 1220 are. At least some of the plurality of light source substrates 1200 may have the plurality of substrate bars 1220 extend from the substrate body 1210 to become distant from the driving board 70 in the second direction Y.

Specifically, on one of the plurality of light source substrates 1200, which is adjacent to one of the pair of vertical borders 15B (e.g., a left border in the direction −Y of FIG. 8), each of the plurality of substrate bars 1220 may extend to the one border 15B (e.g., the left border of FIG. 8) from the substrate body 1210. Symmetrically, on the other one of the plurality of light source substrates 1200, which is adjacent to the other one of the pair of vertical borders 15B (e.g., a right border in the direction +Y of FIG. 8), each of the plurality of substrate bars 1220 may extend to the other border 15B (e.g., the right border of FIG. 8) from the substrate body 1210.

In other words, on one of the plurality of light source substrates 1200, which is adjacent to one of the pair of vertical borders 15B (e.g., a left border in the direction −Y of FIG. 8), each of the plurality of substrate bars 1220 may extend to become distant from the driving board 70 from the substrate body 1210. Symmetrically, on one of the plurality of light source substrates 1200, which is adjacent to the other one of the pair of vertical borders 15B (e.g., a right border in the direction +Y of FIG. 8), each of the plurality of substrate bars 1220 may extend to become distant from the driving board 70 from the substrate body 1210.

In this case, assuming that the one light source substrate 1200 nearer to the one of the pair of vertical borders 15B, i.e., the left border in the direction −Y of FIG. 8, is one of the light source substrates 1200A that are the nearest to the vertical border 15B of the bottom chassis 15 among the plurality of light source substrates 1200 and that the other light source substrate 1200 nearer to the other vertical border 15B (e.g., the right border in the direction +Y of FIG. 8) among the pair of vertical borders 15B is the other one of the light source substrates 1200A that are the nearest to the vertical border 15B of the bottom chassis 15 among the plurality of light source substrates 1200, the distance in the second direction Y between the one vertical border 15B and the one light source substrate 1200A may correspond to the distance in the second direction Y between the other vertical border 15B and the other light source substrate 1200A.

Alternatively, assuming that the one light source substrate 1200 nearer to the one of the pair of vertical borders 15B, i.e., the left border in the direction −Y of FIG. 8, is one of the light source substrates 1200B that are the second-nearest to the vertical border 15B of the bottom chassis 15 among the plurality of light source substrates 1200 and that the other light source substrate 1200 nearer to the other vertical border 15B (e.g., the right border in the direction +Y of FIG. 8) among the pair of vertical borders 15B is the other one of the light source substrates 1200B that are the second-nearest to the vertical border 15B of the bottom chassis 15 among the plurality of light source substrates 1200, the distance in the second direction Y between the one vertical border 15B and the one light source substrate 1200B may correspond to the distance in the second direction Y between the other vertical border 15B and the other light source substrate 1200B.

As such, at least some of the plurality of light source substrates 1200 may be arranged so that the substrate body 1210 is farther away from the border 15A or 15B of the bottom chassis 15 in the horizontal direction Y and is nearer to the driving board 70 in the horizontal direction Y than the plurality of substrate bars 1220 are.

In other words, at least some of the plurality of light source substrates 1200 may be arranged so that the substrate body 1210 is farther away from the short side of the bottom chassis 15 than the plurality of substrate bars 1220 are.

More specifically, some light source substrates 1200A arranged adjacent in the second direction Y to the borders 15A and 15B of the bottom chassis 15 among the plurality of light source substrates 1200 may be arranged so that the substrate body 1210 is farther away from the border 15A or 15B of the bottom chassis 15 in the second direction Y than the plurality of substrate bars 1220 are. Among the plurality of light source substrates 1200, the light source substrate 1200A arranged nearest to the borders 15A and 15B of the bottom chassis 15 in the second direction Y is referred to as a first light source substrate 1200A. The first light source substrate 1200A may be arranged nearest to the border of the display case in the second direction Y.

The vertical border 15B of the bottom chassis 15 is comprised of a pair of vertical borders 15B facing each other, so the first light source substrate 1200A may include at least a pair of first light source substrates 1200A. In other words, the display apparatus 1 may include, among the plurality of light source substrates 1200, a pair of first light source substrates 1200A arranged nearest to the borders 15A and 15B of the bottom chassis 15 in the second direction Y. The pair of first light source substrates 1200A may be arranged to face each other in the second direction Y.

The pair of first light source substrates 1200A being arranged does not exactly mean that there are only two light source substrates 1200A which are the nearest to the borders 15A and 15B of the bottom chassis 15 in the second direction Y among the plurality of light source substrates 1200. For example, as shown in FIG. 8, the plurality of light source substrates 1200 may be arranged in multiple rows and multiple columns. The multiple rows may extend in the second direction Y and may be arranged in the first direction Z. The multiple columns may extend in the first direction Z and may be arranged in the second direction Y. The light source substrates 1200 included in one of the multiple rows may be arranged in the second direction Y, and the light source substrates 1200 included in one of the multiple columns may be arranged in the first direction Z. Especially, on the light source substrates 1200 included in one column, the plurality of substrate bars 1220 may be arranged in the first direction Z and each substrate body 1210 may be arranged in the first direction Z. In this case, a pair of first light source substrates 1200A may be included in each row. The first light source substrates 1200A as many as the number of rows may be included in each of the pair of columns that are the nearest to the vertical border 15B of the bottom chassis 15 in the second direction Y. On the first light source substrates 1200A included in one column, the respective substrate bars 1220 may be arranged in the first direction Z and the respective substrate bodies 1210 may be arranged in the first direction Z. For example, in some embodiments as shown in FIG. 8, the display apparatus 1 may include a total of four first light source substrates 1200A.

Each of the pair of first light source substrates 1200A may be arranged so that the substrate body 1210 is farther away from the border 15A or 15B of the bottom chassis 15 in the second direction Y than the plurality of substrate bars 1220 are. In other words, each of the pair of first light source substrates 1200A may be arranged so that the substrate body 1210 is nearer to the driving board 70 than the plurality of substrate bars 1220 are. On each of the pair of first light source substrates 1200A, the plurality of substrate bars 1220 may extend from the substrate body 1210 to the border 15A or 15B of the bottom chassis 15 in the second direction Y.

For example, one of the pair of first light source substrates 1200A, which is arranged on the left (in the direction −Y), may have the substrate body 1210 arranged on a farther right side (in the direction +Y) than the plurality of substrate bars 1220 are and the plurality of substrate bars 1220 extend to the left from the substrate body 1210. One of the pair of first light source substrates 1200A, which is arranged on the right (in the direction +Y), may have the substrate body 1210 arranged on a farther left side (in the direction −Y) than the plurality of substrate bars 1220 are and the plurality of substrate bars 1220 extend to the right from the substrate body 1210.

For example, when the pair of vertical borders 15B of the bottom chassis 15 include the first vertical border (the vertical border 15B arranged on the left (in the direction −Y) of FIG. 8) and the second vertical border (the vertical border 15B arranged on the right (in the direction +Y) of FIG. 8) facing each other, the plurality of light source substrates 1200 may include a pair of first light source substrates 1200A arranged nearest to the pair of vertical borders 15B, respectively. One of the pair of first light source substrates 1200A, which is arranged nearer to the first vertical border than the second vertical border, i.e., the first light source substrate 1200A arranged on the left (in the direction −Y) of FIG. 8, may be arranged such that the plurality of substrate bars 1220 extend toward the first vertical border, i.e., to the left (in the direction −Y) of FIG. 8, from the substrate body 1210. Symmetrically, the other one of the pair of first light source substrates 1200A, which is arranged nearer to the second vertical border than the first vertical border, i.e., the first light source substrate 1200A arranged on the right (in the direction +Y) of FIG. 8, may be arranged such that the plurality of substrate bars 1220 extend toward the second vertical border, i.e., to the right (in the direction +Y) of FIG. 8, from the substrate body 1210.

In this case, for example, the distance between the first vertical border and the first light source substrate 1200A adjacent to the first vertical border may substantially correspond to the distance between the second vertical border and the other first light source substrate 1200A adjacent to the second vertical boarder.

With this structure, the first light source substrate 1200A may be arranged for the substrate body 1210 to be close to the driving board 70, and the length of the electric wire C connecting the driving board 70 to the connector 1300 may become short. Accordingly, the short electric wire C may lead to a saving of the production costs of the product, reduce noise from the current flowing the electric wire C, and prevent the electric wire C from being interfered by other parts in the display apparatus 1.

Furthermore, when the connector 1300 arranged on the first light source substrate 1200A is arranged to be close to the border 15A or 15B of the bottom chassis 15, it is likely that the electric wire C may be interfered by the border 15A or 15B of the bottom chassis 15 at a location adjacent to the connector 1300, making it hard to connect the electric wire C to the connector 1300. In some embodiments, with the aforementioned structure, the connector 1300 may be arranged farther from the border 15A or 15B of the bottom chassis 15, and the electric wire C may be prevented from being interfered by the border 15A or 15B of the bottom chassis 15.

Furthermore, some other light source substrates 1200B arranged farther from the border 15A or 15B of the bottom chassis 15 in the second direction Y among the plurality of light source substrates 1200 than the first light source substrates 1200A are may be arranged such that the substrate body 1210 is arranged to be farther from the border 15A or 15B of the bottom chassis 15 in the second direction Y than the plurality of substrate bars 1220 are. Some other light source substrates 1200B among the plurality of light source substrates 1200, which are arranged farther from the border 15A or 15B of the bottom chassis 15 in the second direction Y than the first light source substrates 1200A are, are referred to as second light source substrates 1200B. The second light source substrates 1200B may be located farther inside from the borders of the bottom chassis 15 in the second direction Y than the first light source substrates 1200A are.

The second light source substrates 1200B may be arranged so that the distance between the substrate body 1210 and the vertical border 15B is longer than the distance between the plurality of substrate bars 1220 and the vertical border 15B. In other words, the second light source substrate 1200B may be arranged so that the substrate body 1210 is farther away from the border of the display case in the second direction Y than the plurality of substrate bars 1220 are.

On the second light source substrate 1200B, the plurality of substrate bars 1220 may each extend from the substrate body 1210 to the border 15A or 15B of the bottom chassis 15 in the second direction Y. In other words, the second light source substrate 1200B may have the plurality of substrate bars 1220 extend from the substrate body 1210 in a direction becoming distant from the driving board 70.

The second light source substrate 1200B may include at least a pair of second light source substrates 1200B. Specifically, the display apparatus 1 may include a pair of second light source substrates 1200B among the plurality of light source substrates 1200, which are arranged farther from the border 15A or 15B of the bottom chassis 15 in the second direction Y than the first light source substrates 1200A are. The pair of second light source substrates 1200B may be arranged to face each other in the second direction Y.

The pair of second light source substrates 1200B may be arranged between a pair of first light source substrates 1200B. The pair of second light source substrates 1200B may be arranged in parallel with the first light source substrates 1200B in the second direction Y.

For example, as shown in FIG. 8, the plurality of light source substrates 1200 may be arranged in multiple rows and multiple columns, and a pair of second light source substrates 1200B may be included in each row. On the second light source substrates 1200B included in one column, the respective substrate bars 1220 may be arranged in the first direction Z and the respective substrate bodies 1210 may be arranged in the first direction Z. For example, in the embodiment of FIG. 8, the display apparatus 1 may include a total of four second light source substrates 1200B.

Each of the pair of second light source substrates 1200B may be arranged so that the substrate body 1210 is farther away from the border 15A or 15B of the bottom chassis 15 in the second direction Y than the plurality of substrate bars 1220 are. In other words, on each of the pair of second light source substrates 1200B, the plurality of substrate bars 1220 may extend from the substrate body 1210 to the border 15A or 15B of the bottom chassis 15 in the second direction Y. Each of the pair of second light source substrates 1200B may have the plurality of substrate bars 1220 extend from the substrate body 1210 to be farther away from the driving board 70 in the second direction Y. Each of the pair of second light source substrates 1200B may have the plurality of substrate bars 1220 extend from the substrate body 1210 toward the nearer one of the pair of first light source substrates 1200A.

For example, one of the pair of second light source substrates 1200B, which is arranged on the left (in the direction −Y), may have the substrate body 1210 arranged on a farther right side (in the direction +Y) than the plurality of substrate bars 1220 are and the plurality of substrate bars 1220 extend to the left from the substrate body 1210. One of the pair of second light source substrates 1200B, which is arranged on the right (in the direction +Y), may have the substrate body 1210 arranged on a farther left side (in the direction −Y) than the plurality of substrate bars 1220 are and the plurality of substrate bars 1220 extend to the right from the substrate body 1210.

For example, when the pair of vertical borders 15B of the bottom chassis 15 include the first vertical border (the vertical border 15B arranged on the left (in the direction −Y) of FIG. 8) and the second vertical border (the vertical border 15B arranged on the right (in the direction +Y) of FIG. 8) facing each other, the plurality of light source substrates 1200 may include a pair of second light source substrates 1200B arranged between a pair of first light source substrates 1200A. One of the pair of second light source substrates 1200B, which is arranged nearer to the first vertical border than to the second vertical border, i.e., the second light source substrate 1200B arranged on the left (in the direction −Y) of FIG. 8, may be arranged such that the plurality of substrate bars 1220 extend toward the first vertical border, i.e., to the left (in the direction −Y) of FIG. 8, from the substrate body 1210. Symmetrically, the other one of the pair of second light source substrates 1200B, which is arranged nearer to the second vertical border than to the first vertical border, i.e., the second light source substrate 1200B arranged on the right (in the direction +Y)

of FIG. 8, may be arranged such that the plurality of substrate bars 1220 extend toward the second vertical border, i.e., to the right (in the direction +Y) of FIG. 8, from the substrate body 1210.

In this case, for example, the distance between the first vertical border and the second light source substrate 1200B adjacent to the first vertical border may substantially correspond to the distance between the second vertical border and the other second light source substrate 1200B adjacent to the second vertical boarder.

With this structure, the second light source substrate 1200B may be arranged for the substrate body 1210 to be close to the driving board 70, and the length of the electric wire C connecting the driving board 70 to the connector 1300 may become short. Accordingly, the short electric wire C may lead to a saving of the production costs of the product, reduce noise from the current flowing the electric wire C, and prevent the electric wire C from being interfered by other parts in the display apparatus 1.

Among the plurality of light source substrates 1200, each of the pair of second light source substrates 1200B may be arranged to have the shortest distance between the substrate body 1210 and the driving board 70. In other words, the distance between the substrate body 1210 and the driving board 70 of the pair of second light source substrates 1200B may be shorter than the distance between the substrate body 1210 and the driving board 70 of the pair of first light source substrates 1200A.

For example, the pair of second light source substrates 1200B may be arranged to be adjacent to the center of the bottom chassis in the second direction Y. The pair of second light source substrates 1200B may be symmetrically arranged from a center line that passes the center of the bottom chassis 15 in the first direction Z. In this case, the substrate bodies of the pair of second light source substrates 1200B may be arranged to be adjacent to face each other in the second direction Y.

As described above, the plurality of first light source substrates 1200A and the plurality of second light source substrates 1200B may each be configured as the light source substrate 1200 having the same structure. Referring to what is shown in FIG. 8, one of the plurality of light source substrates 1200, which is located on the right (in the direction +Y) of the display apparatus 1 and one of the plurality of light source substrates 1200, which is located on the left (in the direction −Y) of the display apparatus 1 may be arranged to have opposite vertical and horizontal directions (i.e., in a state of being rotated 180 degrees to each other on the X-axis).

The bottom chassis 15 may include projections 15d that protrude from the rear surface of the bottom chassis 15. The projections 15d may include a portion that protrudes farther rearward than the other portions of the bottom chassis 15. For example, the projections 15d may be formed to reinforce the rigidity of the bottom chassis 15. Specifically, the projections 15d may be arranged in a portion of the bottom chassis 15 where the bottom chassis 15 is to be coupled to other parts of the display apparatus 1, thereby reinforcing the rigidity of the portion to be coupled. For example, the bottom chassis 15 may include a plurality of projections 15d.

In this case, when the substrate body 1210 of each of the plurality of light source substrates 1200 is located in front of the projection 15d, connecting the electric wire C to the connector 1300 is likely to be difficult because a portion of the electric wire C connected to the connector 1300 may be interfered by the projection 15d or the connector 1300 may fail to pass through the projection 15d.

Hence, each of the plurality of light source substrates 1200 may be arranged for the connector 1300 to pass through a portion of the bottom chassis 15 which is spaced from the plurality of projections 15d. Specifically, each of the plurality of light source substrates 1200 may be arranged so that the substrate body 1210 is arranged in front of (in the +direction +X) a portion of the bottom chassis 15 other than the projection 15d and the connector 1300 is connected to the electric wire C by passing through the portion of the bottom chassis 15 other than the projection 15d.

For example, when a portion of the projections 15d arranged on the bottom chassis 15, which is arranged adjacent to the border 15A or 15B of the bottom chassis 15 is called a first projection 15da, the connector 1300 arranged on the substrate body 1210 of each of the plurality of first light source substrates 1200A may be arranged to pass through a portion of the bottom chassis 15 spaced from the first projection 15da. Such a layout and structure may be implemented as the first light source substrate 1200A is arranged such that the substrate body 1210 is located farther away from the border 15A or 15B of the bottom chassis 15 in the second direction Y than the plurality of substrate bars 1220 are.

Alternatively, for example, when another portion of the projections 15d arranged on the bottom chassis 15, which is arranged farther away from the border 15A or 15B of the bottom chassis 15 in the second direction Y than the first projection 15da is called a second projection 15da, the connector 1300 arranged on the substrate body 1210 of each of the plurality of first light source substrates 1200A may be arranged to pass through a portion of the bottom chassis 15 spaced from the second projection 15db.

For example, unlike what is shown in FIG. 1, when the display apparatus 1 is a wall-mounted type display apparatus that is installed on the wall by a wall-mounted bracket, the second projection 15d may include a portion where the wall-mounted bracket is mounted.

The display apparatus 1 of FIGS. 8 and 9 may have the screen 12 with a diagonal length of 65 inches, but the length is not limited thereto.

Although the display apparatus 1 is illustrated in FIG. 8 as including eight light source modules 1000, the number of light source modules 1000 included in the display apparatus 1 according to the disclosure is not limited to what is shown in FIG. 8. For example, the display apparatus 1 may include more or fewer light source modules 1000 than shown in FIG. 8.

An embodiment where the display apparatus 1 has the screen 12 of a different size and a different number of light source modules 1000 than in the embodiment as shown in FIGS. 8 and 9 will now be described in connection with FIGS. 10 to 15.

Figure 10:
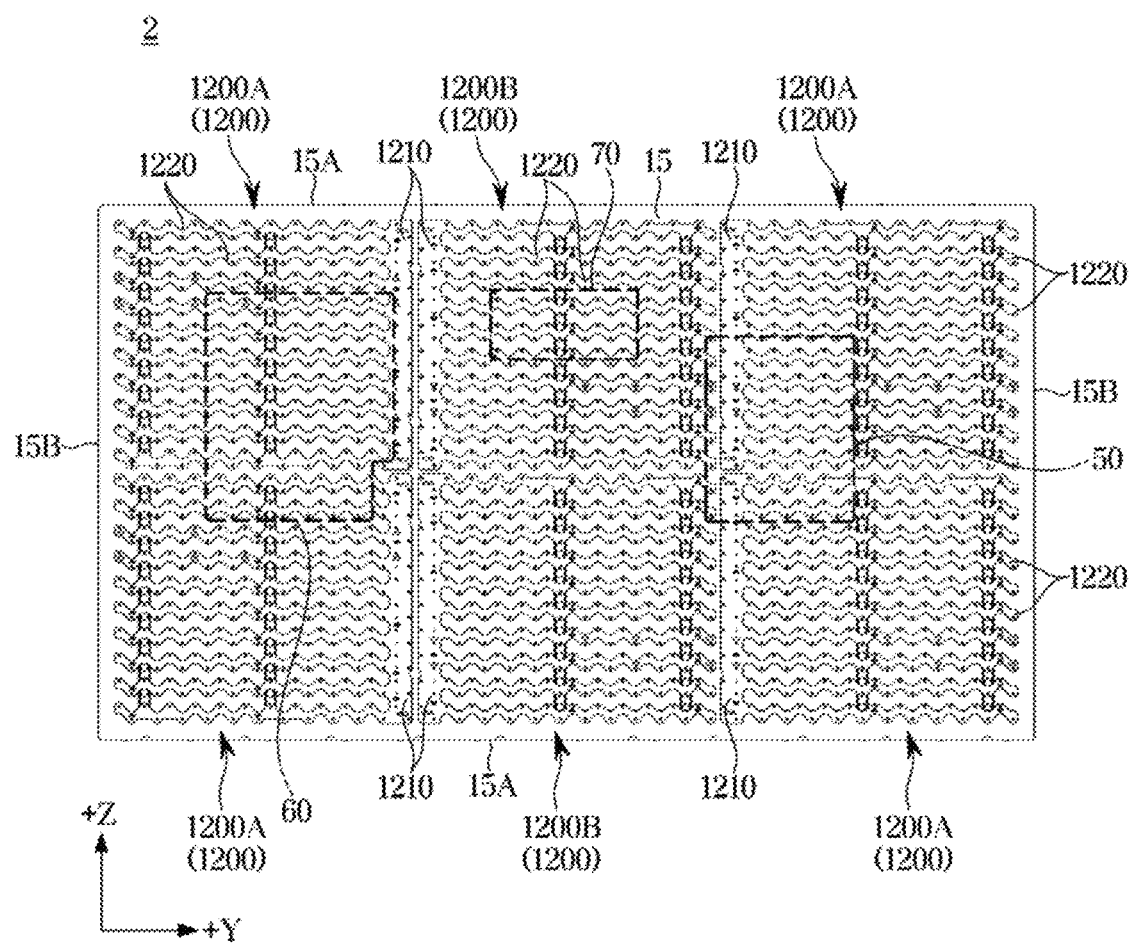
FIG. 10 is a front view of light source substrates and a bottom chassis of a display apparatus according to some embodiments of the disclosure.
Figure 11:
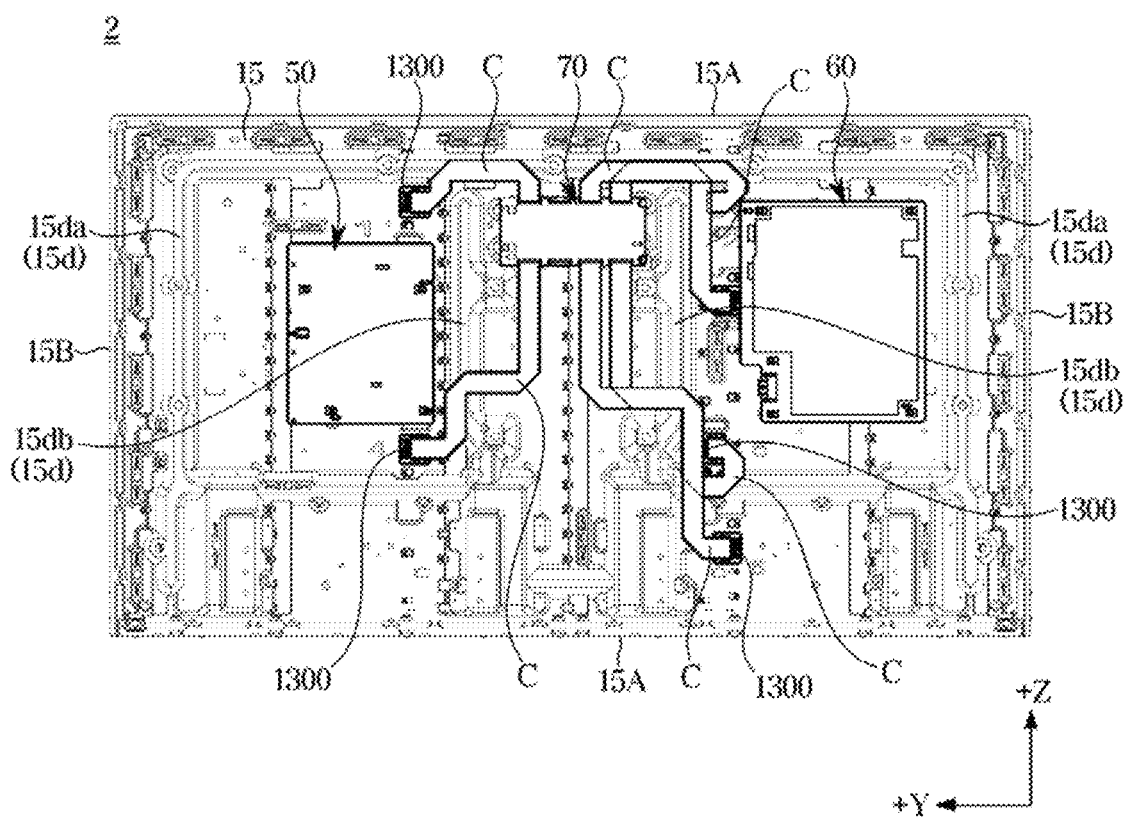
FIG. 11 is a rear view of PBAs and a bottom chassis of a display apparatus according to some embodiments of the disclosure.

FIG. 10 is a front view of light source substrates and a bottom chassis of a display apparatus, according to some embodiments of the disclosure. FIG. 11 is a rear view of PBAs and a bottom chassis of a display apparatus, according to some embodiments of the disclosure.

Referring to FIGS. 10 and 11, in describing the structure of a display apparatus 2, overlapping components with those of the display apparatus 1 have the same reference numerals as in the embodiments of FIGS. 1 to 9 and the descriptions thereof will not be repeated.

Referring to FIGS. 10 and 11, the display apparatus 2 may include a plurality of light source substrates 1200. Some light source substrates 1200A arranged adjacent in the second direction Y to the borders 15A and 15B of the bottom chassis 15 among the plurality of light source substrates 1200 may be arranged so that the substrate body 1210 is farther away from the border 15A or 15B of the bottom chassis 15 in the second direction Y than the plurality of substrate bars 1220 are.

Specifically, the display apparatus 2 may include, among the plurality of light source substrates 1200, a pair of first light source substrates 1200A nearest to the borders 15A and 15B of the bottom chassis 15 in the second direction Y. The pair of first light source substrates 1200A may be arranged to face each other in the second direction Y. In this case, each of the pair of first light source substrates 1200A may be arranged so that the substrate body 1210 is farther away from the border 15A or 15B of the bottom chassis 15 in the second direction Y than the plurality of substrate bars 1220 are. In other words, on each of the pair of first light source substrates 1200A, the plurality of substrate bars 1220 may extend from the substrate body 1210 to the border 15A or 15B of the bottom chassis 15 in the second direction Y.

As shown in FIG. 10, a pair of first light source substrates 1200A may be included in one row. The first light source substrates 1200A as many as the number of rows may be included in each of the pair of columns that are the nearest to the vertical border 15B of the bottom chassis 15 in the second direction Y. For example, in the embodiment of FIG. 10, the display apparatus 2 may include a total of four first light source substrates 1200A.

The display apparatus 2 may include a second light source substrate 1200B arranged farther from the border 15A or 15B of the bottom chassis 15 in the second direction Y than the pair of first light source substrates 1200A are. The second light source substrate 1200B may be located farther inside from the borders of the bottom chassis 15 in the second direction Y than the first light source substrates 1200A are. The distance between the second light source substrate 1200B and the driving board 70 in the second direction Y may be shorter than the distance between the first light source substrate 1200A and the driving board 70 in the second direction Y. The second light source substrate 1200B may be arranged between the pair of first light source substrates 1200A. The second light source substrate 1200B may be arranged in parallel with the first light source substrates 1200A in the second direction Y.

For example, the second light source substrate 1200B may be arranged in a center portion of the bottom chassis in the second direction Y. The second light source substrate 1200B may be arranged so that the distance to one of the pair of vertical borders 15B is substantially equal to the distance to the other one of the pair of vertical borders 15B.

As shown in FIG. 10, the second light source substrate 1200B included in one row among the plurality of light source substrates 1200 may be provided in the singular. For example, in the embodiment of FIG. 10, the display apparatus 2 may include a total of two second light source substrates 1200B.

As shown in FIG. 10, the second light source substrate 1200B may be arranged for the substrate body 1210 to be adjacent to the substrate body 1220 of one of the pair of first light source substrates 1200A. Furthermore, the second light source substrate 1200B may have the plurality of substrate bars 1220 extend from the substrate body 1210 toward the substrate body 1210 of the other one of the pair of first light source substrates 1200A in the second direction Y.

For example, the second light source substrate 1200B may be arranged for the substrate body 1210 to be adjacent to the first vertical border (e.g., the left border (in the direction −Y) of FIG. 10) of the pair of vertical borders 15B of the bottom chassis 15. The second light source substrate 1200B may have the plurality of substrate bars 1220 extend from the substrate body 1210 toward the second vertical border (e.g., the right border (in the direction +Y) of FIG. 10).

The display apparatus 2 may further include the first board 50 and the second board 60 configured as PBAs in addition to the driving board 70. The first board 50 and the second board 60 may each be electrically connected to the driving board 70. The first board 50 and the second board 60 may each include a plurality of connection ports arranged for electric wires or electric parts to be connected thereto.

For example, the first board 50, the driving board 70 and the second board 60 may be arranged substantially along the second direction Y. However, the first board 50, the driving board 70 and the second board 60 may not be arranged to be exactly parallel to each other along the second direction Y as shown in FIGS. 10 and 11.

The second light source substrate 1200B may have the substrate body 1210 arranged to be closer to the second board than to the first board 50. In other words, the distance between the substrate body 1210 of the second light source substrate 1200B and the second board 60 in the second direction Y may be shorter than the distance between the substrate body 1210 of the second light source substrate 1200B and the first board 50 in the second direction Y.

In this case, for example, there may be more connection ports of the first board 50 than the connection ports of the second board 60. As the first board 50 has more connection ports than the second board 60 does, there may be more electric wires or electronic parts connected to the connection ports of the first board 50 than the electric wires or electronic parts connected to the connection ports of the second board 60. Hence, the second light source substrate 1200B may be arranged so that the substrate body 1210 is closer to the second board 60 than to the first board 50 in the second direction Y to reduce interference of the electric wire C connected to the connector 1300 with parts connected to the connection ports of the other boards 50 and 60.

For example, the first board 50 may be a main board and the second board 60 may be a power supply board.

For example, the display apparatus 2 of FIGS. 10 and 11 may have the screen 12 with a diagonal length of 55 inches, but the length is not limited thereto.

Figure 12:
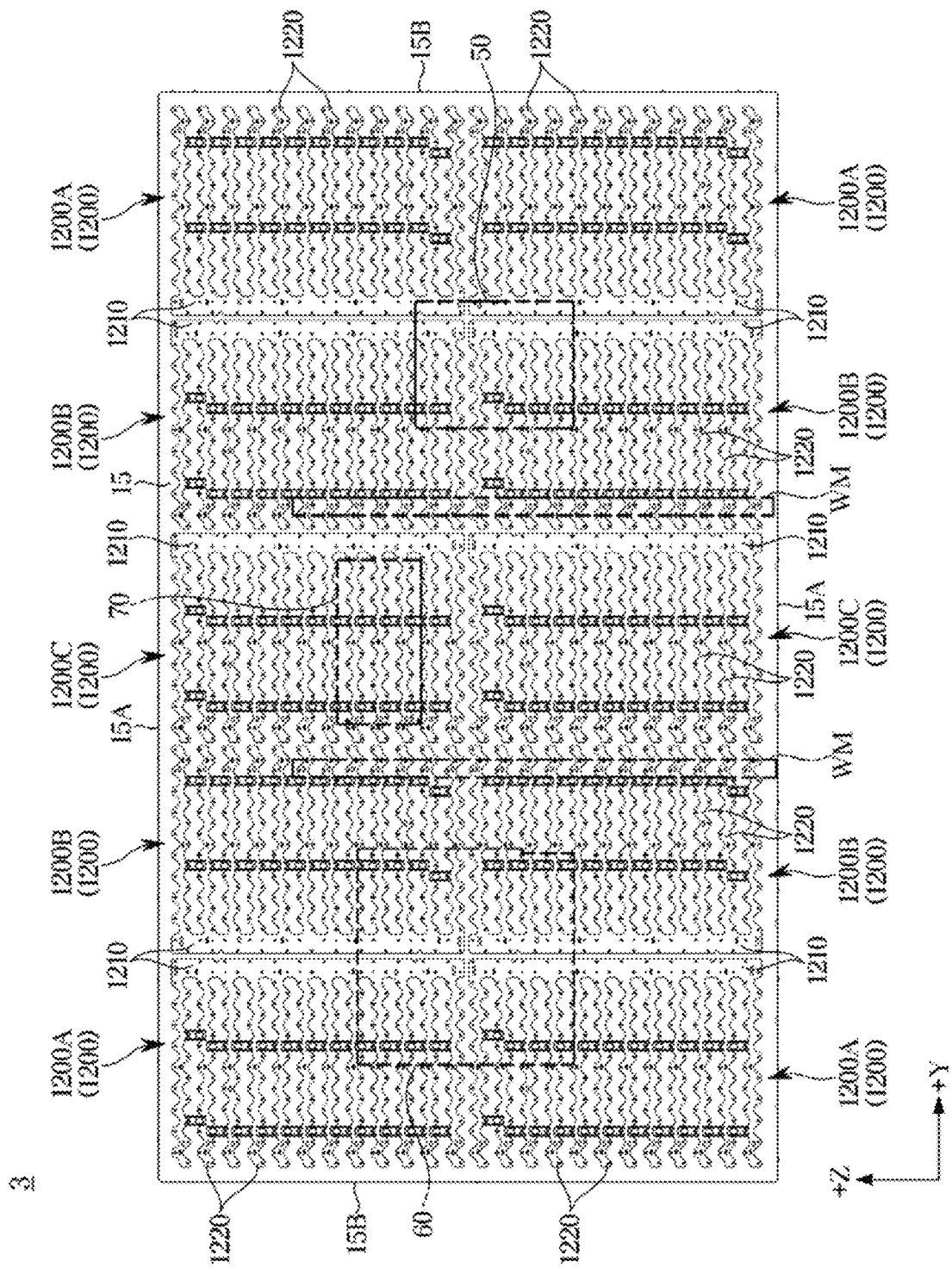
FIG. 12 is a front view of light source substrates and a bottom chassis of a display apparatus according to some embodiments of the disclosure.
Figure 13:
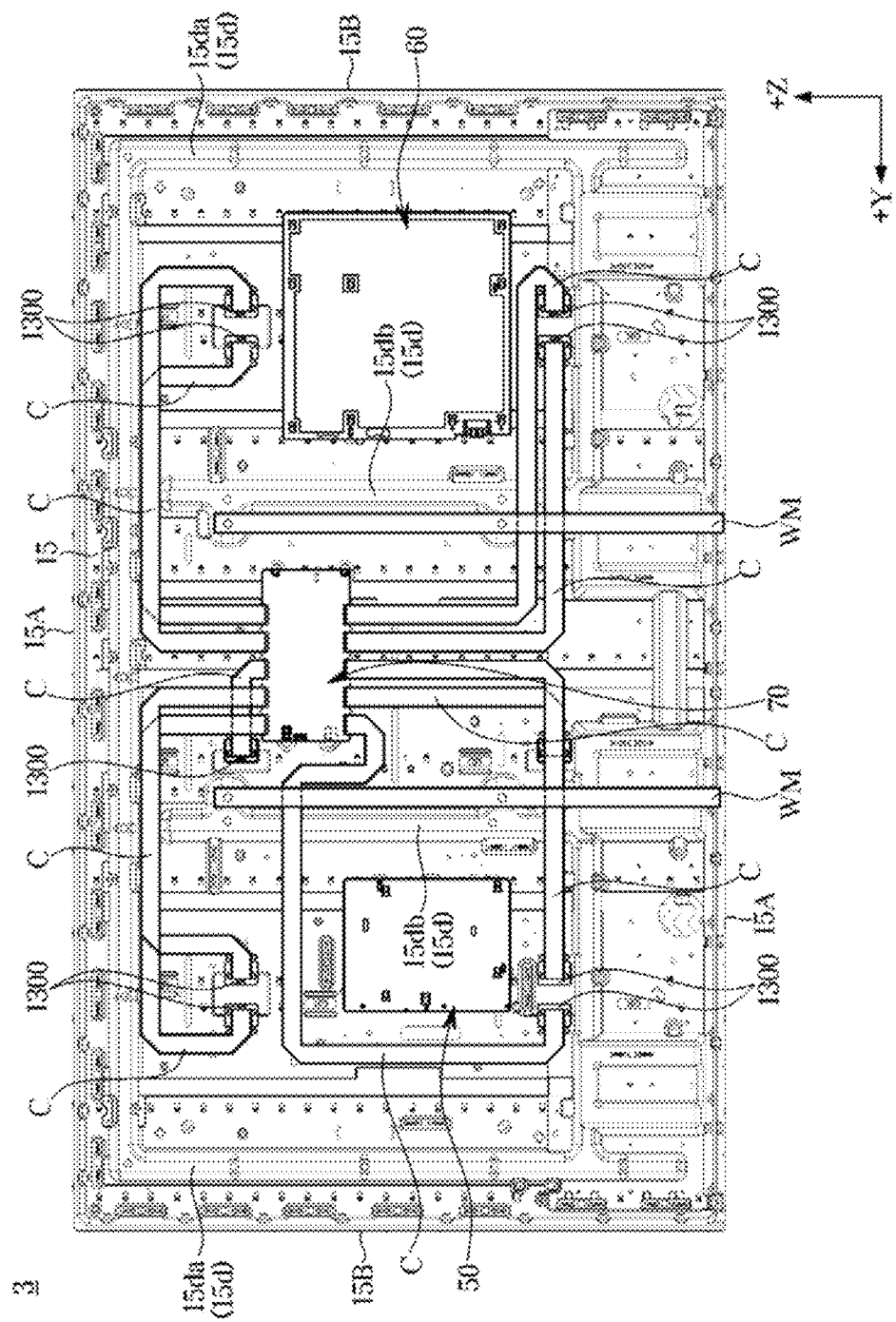
FIG. 13 is a rear view of PBAs and a bottom chassis of a display apparatus according to some embodiments of the disclosure.

FIG. 12 is a front view of light source substrates and a bottom chassis of a display apparatus, according to some embodiments of the disclosure. FIG. 13 is a rear view of PBAs and a bottom chassis of a display apparatus, according to some embodiments of the disclosure.

Referring to FIGS. 12 and 13, in describing the structure of a display apparatus 3, overlapping components with those of the display apparatus 1 have the same reference numerals as in the embodiments of FIGS. 1 to 9 and the descriptions thereof will not be repeated.

Referring to FIGS. 12 and 13, the display apparatus 3 may include a plurality of light source substrates 1200. Some light source substrates 1200A arranged adjacent in the second direction Y to the borders 15A and 15B of the bottom chassis 15 among the plurality of light source substrates 1200 may be arranged so that the substrate body 1210 is farther away from the border 15A or 15B of the bottom chassis 15 in the second direction Y than the plurality of substrate bars 1220 are.

Specifically, the display apparatus 3 may include, among the plurality of light source substrates 1200, a pair of first light source substrates 1200A nearest to the borders 15A and 15B of the bottom chassis 15 in the second direction Y. The pair of first light source substrates 1200A may be arranged to face each other in the second direction Y. In this case, each of the pair of first light source substrates 1200A may be arranged so that the substrate body 1210 is farther away from the border 15A or 15B of the bottom chassis 15 in the second direction Y than the plurality of substrate bars 1220 are. In other words, on each of the pair of first light source substrates 1200A, the plurality of substrate bars 1220 may extend from the substrate body 1210 to the border 15A or 15B of the bottom chassis 15 in the second direction Y. The pair of first light source substrates 1200A may have the plurality of substrate bars 1220 extend from the substrate body 1210 in a direction that is farther away from the driving board 70.

As shown in FIG. 12, a pair of first light source substrates 1200A may be included in one row. The first light source substrates 1200A as many as the number of rows may be included in each of the pair of columns that are the nearest to the vertical border 15B of the bottom chassis 15 in the second direction Y. For example, in the embodiment of FIG. 12, the display apparatus 3 may include a total of four first light source substrates 1200A.

Some other light source substrates 1200B arranged farther from the border 15A or 15B of the bottom chassis 15 in the second direction Y among the plurality of light source substrates 1200 than the first light source substrates 1200A are may have the substrate body 1210 arranged to be nearer to the border 15A or 15B of the bottom chassis 15 in the second direction Y than the plurality of substrate bars 1220 are.

Specifically, the display apparatus 3 may include a pair of second light source substrates 1200B arranged between a pair of first light source substrates 1200A. The pair of second light source substrates 1200B may be arranged to be farther away from the border 15A or 15B of the bottom chassis 15 in the second direction Y than the pair of first light source substrates 1200A. The pair of second light source substrates 1200B may be located farther inside of the bottom chassis 15 in the second direction Y than the pair of first light source substrates 1200A are. The pair of second light source substrates 1200B may be arranged to face each other in the second direction Y.

As shown in FIG. 12, a pair of second light source substrates 1200B may be included in one row. For example, in the embodiment of FIG. 12, the display apparatus 3 may include a total of four second light source substrates 1200B.

In this case, each of the pair of second light source substrates 1200B may be arranged so that the substrate body 1210 is nearer to the border 15A or 15B of the bottom chassis 15 in the second direction Y than the plurality of substrate bars 1220 are. In other words, each of the pair of second light source substrates 1200B may have the plurality of substrate bars 1220 extend from the substrate body 1210 toward the farther one of the pair of first light source substrates 1200A. In other words, each of the pair of second light source substrate 1200B may have the plurality of substrate bars 1220 extend from the substrate body 1210 in a direction that is closer to the driving board 70.

For example, of the pair of second light source substrates 1200B, the second light source substrate 1200B (the second light source substrate arranged on the left (in the direction −Y) of FIG. 12) arranged to be nearer to the first vertical border (the vertical border 15B arranged on the left (in the direction −Y) of FIG. 12) than to the first vertical border (the vertical border 15B arranged on the right (in the direction +Y) of FIG. 12) may be arranged so that the plurality of substrate bars 1220 extend from the substrate body 1210 toward the second vertical border (i.e., to the right (in the direction +Y) of FIG. 12). Symmetrically, the other one of the pair of second light source substrates 1200B, which is arranged nearer to the second vertical border than the first vertical border, i.e., the second light source substrate 1200B arranged on the right (in the direction +Y) of FIG. 12, may have the plurality of substrate bars 1220 extend toward the first vertical border, i.e., to the left (in the direction −Y) of FIG. 12, from the substrate body 1210.

In this case, for example, the distance between the first vertical border and the second light source substrate 1200B adjacent to the first vertical border may substantially correspond to the distance between the second vertical border and the other second light source substrate 1200B adjacent to the second vertical boarder.

As shown in FIG. 13, the bottom chassis 15 may include a plurality of projections 15*d* that protrude rearward (in the direction −X) from the rear surface of the bottom chassis 15. The structure and characteristics of the projections 15*d* of the bottom chassis 15 may correspond to the projections 15*d* as shown in FIG. 9. The bottom chassis 15 may include the first projection 15*da* and the second projection 15*db*. The second projection 15*db* in particular, of the bottom chassis 15 may be arranged to be coupled to a wall-mounted bracket WM.

Each of the plurality of light source substrates 1200 may be arranged for the connector 1300 to pass through a portion of the bottom chassis 15 which is spaced from the plurality of projections 15*d*. Specifically, each of the plurality of light source substrates 1200 may be arranged so that the substrate body 1210 is arranged in front of (in the +X direction) a portion of the bottom chassis 15 other than the projection 15*d* and the connector 1300 is connected to the electric wire C by passing through the portion of the bottom chassis 15 other than the projection 15*d*.

For example, the connector 1300 arranged on the substrate body 1210 of each of the plurality of first light source substrates 1200A may be arranged to pass through a portion of the bottom chassis 15 which is spaced from the first projection 15*da*. Such a layout and structure may be implemented as the first light source substrate 1200A has the substrate body 1210 located farther away from the border 15A or 15B of the bottom chassis 15 in the second direction Y than the plurality of substrate bars 1220 are.

Furthermore, for example, the connector 1300 arranged on the substrate body 1210 of each of the plurality of second light source substrates 1200B may be arranged to pass through a portion of the bottom chassis 15 which is spaced from the second projection 15*db*. Such a layout and structure may be implemented as the second light source substrate 1200B has the substrate body 1210 located nearer to the border 15A or 15B of the bottom chassis 15 in the second direction Y than the plurality of substrate bars 1220 are. With this structure, the connector 1300 of the second light source substrate 1200B and the electric wire C connected thereto may not be interfered not only by the second projection 15*db* but also by the wall-mounted bracket WM.

The display apparatus 3 may include a third light source substrate 1200C arranged farther from the border 15A or 15B of the bottom chassis 15 in the second direction Y than the pair of second light source substrates 1200B are. The third light source substrate 1200C may be located farther inside from the borders of the bottom chassis 15 in the second direction Y than the second light source substrates 1200B are. The distance between the third light source substrate 1200C and the driving board 70 in the second direction Y may be shorter than the distance between the second light source substrate 1200B and the driving board 70 in the second direction Y. The third light source substrate 1200C may be arranged between the pair of second light source substrates 1200B. The third light source substrate 1200C may be arranged in parallel with the pair of first light source substrates 1200A and the pair of second light source substrates 1200B in the second direction Y.

For example, the third light source substrate 1200C may be arranged in a center of the bottom chassis in the second direction Y. The third light source substrate 1200C may be arranged so that the distance to one of the pair of vertical borders 15B is substantially equal to the distance to the other of the pair of vertical borders 15B.

As shown in FIG. 12, the third light source substrate 1200C included in one row may be provided in the singular. For example, in the embodiment of FIG. 12, the display apparatus 3 may include a total of two third light source substrates 1200C.

As shown in FIG. 12, the third light source substrate 1200C may be arranged so that the substrate body 1210 is adjacent to the substrate body 1220 of one of the pair of second light source substrates 1200B and the plurality of substrate bars 1220 extend from the substrate body 1220 toward the substrate body 1210 of the other one of the second light source substrates 1200B in the second direction Y.

For example, the second light source substrate 1200B may be arranged for the substrate body 1210 to be adjacent to the second vertical border (e.g., the right border (in the direction +Y) of FIG. 12) of the pair of vertical borders 15B of the bottom chassis 15. The second light source substrate 1200B may have the plurality of substrate bars 1220 extend from the substrate body 1210 toward the first vertical border (e.g., the left border (in the direction −Y) of FIG. 12).

For example, the display apparatus 3 of FIGS. 12 and 13 may have the screen 12 with a diagonal length of 75 inches, but the length is not limited thereto.

Figure 14:
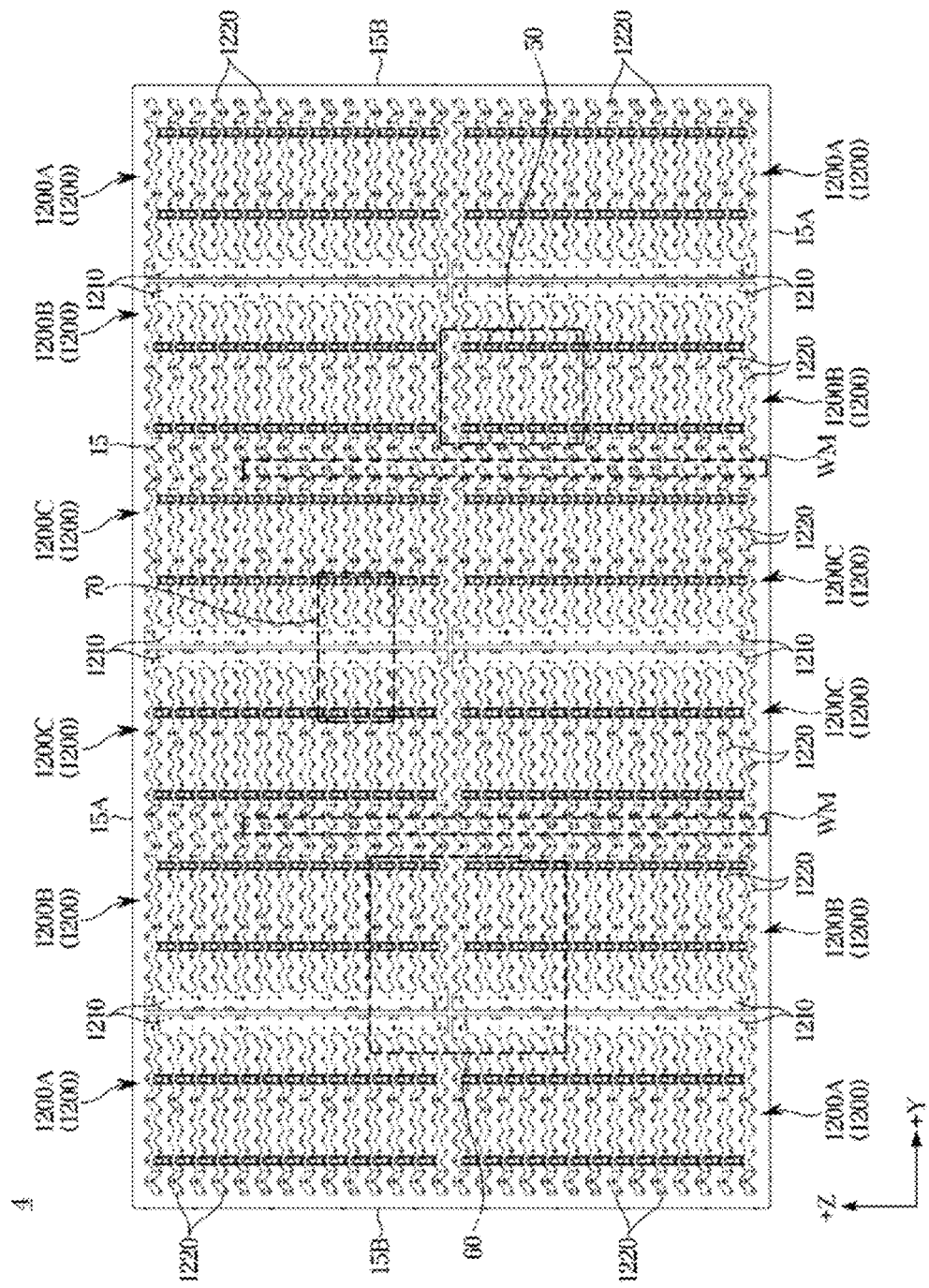
FIG. 14 is a front view of light source substrates and a bottom chassis of a display apparatus according to some embodiments of the disclosure.
Figure 15:
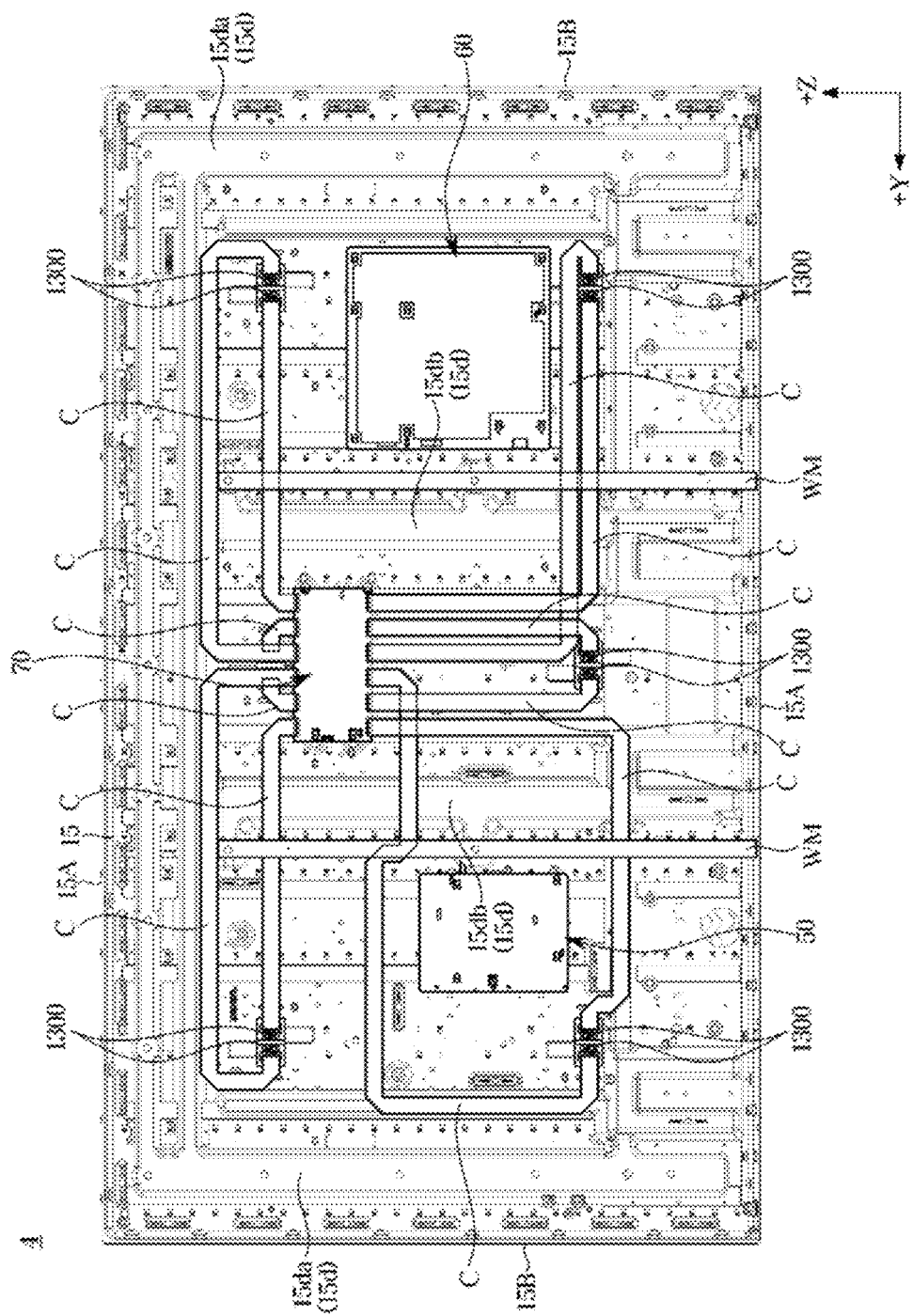
FIG. 15 is a rear view of printed circuit board assemblies and a bottom chassis of a display apparatus according to some embodiments of the disclosure.

FIG. 14 is a front view of light source substrates and a bottom chassis of a display apparatus, according to some embodiments of the disclosure. FIG. 15 is a rear view of printed circuit board assemblies (PBAs) and a bottom chassis of a display apparatus, according to some embodiments of the disclosure.

Referring to FIGS. 14 and 15, in describing the structure of a display apparatus 4, overlapping components with those of the display apparatus 1 have the same reference numerals as in the embodiments of FIGS. 1 to 9 and the descriptions thereof will not be repeated.

Referring to FIGS. 14 and 15, the display apparatus 4 may include a plurality of light source substrates 1200. Some light source substrates 1200A arranged adjacent in the second direction Y to the borders 15A and 15B of the bottom chassis 15 among the plurality of light source substrates 1200 may be arranged so that the substrate body 1210 is farther away from the border 15A or 15B of the bottom chassis 15 in the second direction Y than the plurality of substrate bars 1220 are.

Specifically, the display apparatus 4 may include, among the plurality of light source substrates 1200, a pair of first light source substrates 1200A nearest to the borders 15A and 15B of the bottom chassis 15 in the second direction Y. The pair of first light source substrates 1200A may be arranged to face each other in the second direction Y. In this case, each of the pair of first light source substrates 1200A may be arranged so that the substrate body 1210 is farther away from the border 15A or 15B of the bottom chassis 15 in the second direction Y than the plurality of substrate bars 1220 are. In other words, on each of the pair of first light source substrates 1200A, the plurality of substrate bars 1220 may extend from the substrate body 1210 to the border 15A or 15B of the bottom chassis 15 in the second direction Y. The pair of first light source substrates 1200A may have the plurality of substrate bars 1220 extend from the substrate body 1210 in a direction that is farther away from the driving board 70.

As shown in FIG. 14, a pair of first light source substrates 1200A may be included in one row. The first light source substrates 1200A as many as the number of rows may be included in each of the pair of columns that are the nearest to the vertical border 15B of the bottom chassis 15 in the second direction Y. For example, in the embodiment of FIG. 14, the display apparatus 4 may include a total of four first light source substrates 1200A.

Some other light source substrates 1200B arranged farther from the border 15A or 15B of the bottom chassis 15 in the second direction Y among the plurality of light source substrates 1200 than the first light source substrates 1200A are may have the substrate body 1210 arranged to be nearer to the border 15A or 15B of the bottom chassis 15 in the second direction Y than the plurality of substrate bars 1220 are.

Specifically, the display apparatus 4 may include a pair of second light source substrates 1200B arranged between a pair of first light source substrates 1200A. The pair of second light source substrates 1200B may be arranged to be farther away from the border 15A or 15B of the bottom chassis 15 in the second direction Y than the pair of first light source substrates 1200A. The pair of second light source substrates 1200B may be located farther inside of the bottom chassis 15 in the second direction Y than the pair of first light source substrates 1200A are. The pair of second light source substrates 1200A may be arranged to face each other in the second direction Y.

As shown in FIG. 14, a pair of second light source substrates 1200B may be included in one row. For example, in the embodiment of FIG. 14, the display apparatus 4 may include a total of four second light source substrates 1200B.

In this case, each of the pair of second light source substrates 1200B may be arranged so that the substrate body 1210 is nearer to the border 15A or 15B of the bottom chassis 15 in the second direction Y than the plurality of substrate bars 1220 are. In other words, each of the pair of second light source substrates 1200B may have the plurality of substrate bars 1220 extend from the substrate body 1210 toward the farther one of the pair of first light source substrates 1200A. In other words, each of the pair of second light source substrate 1200B may have the plurality of substrate bars 1220 extend from the substrate body 1210 in a direction that is nearer to the driving board 70.

Each of the plurality of light source substrates 1200 may be arranged for the connector 1300 to pass through a portion of the bottom chassis 15 which is spaced from the plurality of projections 15d of the bottom chassis 15. Specifically, each of the plurality of light source substrates 1200 may be arranged so that the substrate body 1210 is arranged in front of (in the +direction +X) a portion of the bottom chassis 15 other than the projection 15d and the connector 1300 is connected to the electric wire C by passing through the portion of the bottom chassis 15 other than the projection 15d.

For example, the connector 1300 arranged on the substrate body 1210 of each of the plurality of first light source substrates 1200A may be arranged to pass through a portion of the bottom chassis 15 which is spaced from the first projection 15da. Such a layout and structure may be implemented as the first light source substrate 1200A has the substrate body 1210 located farther away from the border 15A or 15B of the bottom chassis 15 in the second direction Y than the plurality of substrate bars 1220 are.

Furthermore, for example, the connector 1300 arranged on the substrate body 1210 of each of the plurality of second light source substrates 1200B may be arranged to pass through a portion of the bottom chassis 15 which is spaced from the second projection 15db. Such a layout and structure may be implemented as the second light source substrate 1200B has the substrate body 1210 located nearer to the border 15A or 15B of the bottom chassis 15 in the second direction Y than the plurality of substrate bars 1220 are. With this structure, the connector 1300 of the second light source substrate 1200B and the electric wire C connected thereto may not be interfered not only by the second projection 15db but also by the wall-mounted bracket WM.

The display apparatus 3 may include a pair of third light source substrates 1200C arranged farther from the border 15A or 15B of the bottom chassis 15 in the second direction Y than the pair of second light source substrates 1200B are. The pair of third light source substrates 1200C may be located farther inside from the borders of the bottom chassis 15 in the second direction Y than the pair of second light source substrates 1200B are. The distance between each of the pair of third light source substrates 1200C and the driving board 70 in the second direction Y may be shorter than the distance between each of the pair of second light source substrates 1200B and the driving board 70 in the second direction Y. The pair of third light source substrates 1200C may be arranged between the pair of second light source substrates 1200B. The pair of third light source substrates 1200C may be arranged in parallel with the pair of first light source substrates 1200A and the pair of second light source substrates 1200B in the second direction Y. The pair of third light source substrates 1200C may be arranged to face each other in the second direction Y.

As shown in FIG. 14, a pair of third light source substrates 1200C may be included in each row. On the third light source substrates 1200C included in one row, the respective substrate bars 1220 may be arranged in the first direction Z and the respective substrate bodies 1210 may be arranged in the first direction Z. For example, in the embodiment of FIG. 14, the display apparatus 4 may include a total of four third light source substrates 1200C.

Each of the pair of third light source substrates 1200C may be arranged so that the substrate body 1210 is farther away from the border 15A or 15B of the bottom chassis 15 in the second direction Y than the plurality of substrate bars 1220 are. In other words, on each of the pair of third light source substrates 1200C, the plurality of substrate bars 1220 may extend from the substrate body 1210 to the border 15A or 15B of the bottom chassis 15 in the second direction Y. Each of the pair of third light source substrates 1200C may have the plurality of substrate bars 1220 extend from the substrate body 1210 to grow distant from the driving board 70 in the second direction Y. Each of the pair of third light source substrates 1200C may have the plurality of substrate bars 1220 extend from the substrate body 1210 toward the nearer one of the pair of second light source substrates 1200BA.

For example, one of the pair of third light source substrates 1200C, which is arranged on the left (in the direction −Y), may have the substrate body 1210 arranged on a farther right side (in the direction +Y) than the plurality of substrate bars 1220 are and the plurality of substrate bars 1220 extend to the left from the substrate body 1210. One of the pair of third light source substrates 1200C, which is arranged on the right (in the direction +Y), may have the substrate body 1210 arranged on a farther left side (in the direction −Y) than the plurality of substrate bars 1220 are and the plurality of substrate bars 1220 extend to the right from the substrate body 1210.

For example, of the pair of third light source substrates 1200C, the third light source substrate 1200C (the third light source substrate arranged on the left (in the direction −Y) of FIG. 14) arranged to be nearer to the first vertical border (the vertical border 15B arranged on the left (in the direction −Y) of FIG. 14) than to the second vertical border (the vertical border 15B arranged on the right (in the direction +Y) of FIG. 14) may be arranged so that the plurality of substrate bars 1220 extend from the substrate body 1210 toward the first vertical border (i.e., to the left (in the direction −Y) of FIG. 14). Symmetrically, the other one of the pair of third light source substrates 1200C, which is arranged nearer to the second vertical border than the first vertical border, i.e., the third light source substrate 1200C arranged on the right (in the direction +Y) of FIG. 14, may have the plurality of substrate bars 1220 extend toward the second vertical border, i.e., to the right (in the direction +Y) of FIG. 14, from the substrate body 1210.

In this case, for example, the distance between the first vertical border and the third light source substrate 1200C adjacent to the first vertical border may substantially correspond to the distance between the second vertical border and the other third light source substrate 1200C adjacent to the second vertical boarder.

With this structure, the third light source substrates 1200C may be arranged for the substrate body 1210 to be close to the driving board 70, and the length of the electric wire C connecting the driving board 70 to the connector 1300 may become short.

Among the plurality of light source substrates 1200, each of the pair of third light source substrates 1200C may be arranged to have the shortest distance between the substrate body 1210 and the driving board 70.

For example, the pair of third light source substrates 1200C may be arranged to be adjacent to the center of the bottom chassis in the second direction Y. The pair of third light source substrates 1200C may be symmetrically arranged from a center line that passes the center of the bottom chassis 15 in the first direction Z. In this case, the substrate bodies of the pair of third light source substrates 1200C may be arranged to be adjacent to face each other in the second direction Y.

For example, the connector 1300 arranged on the substrate body 1210 of each of the plurality of third light source substrates 1200C may be arranged to pass through a portion of the bottom chassis 15 which is spaced from the second projection 15db.

For example, the display apparatus 4 of FIGS. 14 and 15 may have the screen 12 with a diagonal length of 85 inches, but the length is not limited thereto.

Figure 16:
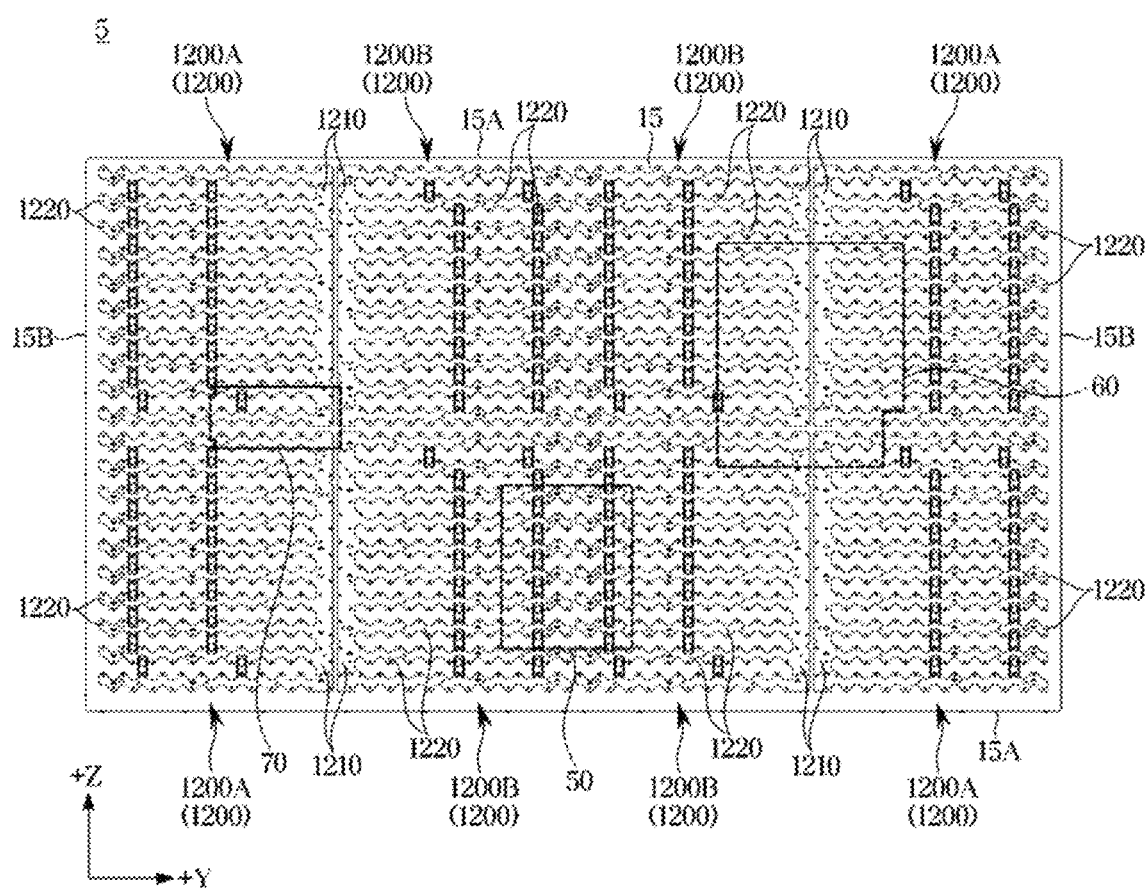
FIG. 16 is a front view of light source substrates and a bottom chassis of a display apparatus according to some embodiments of the disclosure.

FIG. 16 is a front view of light source substrates and a bottom chassis of a display apparatus, according to some embodiments of the disclosure.

Referring to FIG. 16, in describing the structure of a display apparatus 5, overlapping components with those of the display apparatus 1 have the same reference numerals as in the embodiments of FIGS. 1 to 9 and the descriptions thereof will not be repeated.

Referring to FIG. 16, in an embodiment of the disclosure, the display apparatus 5 may include the plurality of light source substrates 1200. The display apparatus 5 may include the driving board 70 electrically connected to each of the plurality of light source substrates 1200 to control operation of the light source 1100 mounted on each light source substrate 1200. The driving board 70 may be electrically connected to the light source substrate 1200 via the electric wire C connected to the connector 1300 arranged on the substrate body 1210 of the light source substrate 1200.

Unlike in the aforementioned embodiments, the driving board 70 may be arranged to be lopsided to one of the pair of vertical borders 15B of the bottom chassis 15. For example, the driving board 70 may be arranged to be lopsided to one side from the center of the bottom chassis 15 in the second direction Y. However, when the driving board 70 is arranged as closely as it overlays or almost overlays one of the pair of vertical borders 15B of the bottom chassis 15, it is not desirable because it is possible that the electric wire C or electronic parts connected to the driving board 70 are interfered by the inner border of the display case, so the driving board 70 may be arranged at a position spaced inward even from a nearer one of the pair of vertical borders 15B of the bottom chassis 15 in the second direction Y, as shown in FIG. 16.

In this case, some light source substrates 1200A arranged adjacent in the second direction Y to the borders 15A and 15B of the bottom chassis 15 among the plurality of light source substrates 1200 may be arranged so that the substrate body 1210 is farther away from the border 15A or 15B of the bottom chassis 15 in the second direction Y than the plurality of substrate bars 1220 are.

Specifically, the display apparatus 2 may include, among the plurality of light source substrates 1200, a pair of first light source substrates 1200A nearest to the borders 15A and 15B of the bottom chassis 15 in the second direction Y. Each of the pair of first light source substrates 1200A may be arranged so that the substrate body 1210 is farther away from the border 15A or 15B of the bottom chassis 15 in the second direction Y than the plurality of substrate bars 1220 are.

For example, one of the pair of first light source substrates 1200A, which is arranged nearer to the first vertical border (on the left in the direction −Y of FIG. 16) than to the second vertical border (on the right in the direction +Y of FIG. 16), i.e., the first light source substrate 1200A arranged on the left (in the direction −Y) of FIG. 16, may be arranged to have the plurality of substrate bars 1220 extend toward the first vertical border, i.e., to the left (in the direction −Y) of FIG. 16, from the substrate body 1210. Symmetrically, the other one of the pair of first light source substrates 1200A, which is arranged nearer to the second vertical border than the first vertical border, i.e., the first light source substrate 1200A arranged on the right (in the direction +Y) of FIG. 16, may be arranged such that the plurality of substrate bars 1220 extend toward the second vertical border, i.e., to the right (in the direction +Y) of FIG. 16, from the substrate body 1210.

In this case, for example, the distance between the first vertical border and the first light source substrate 1200A adjacent to the first vertical border may substantially correspond to the distance between the second vertical border and the other first light source substrate 1200A adjacent to the second vertical boarder.

As shown in FIG. 16, a pair of first light source substrates 1200A may be included in one row. The first light source substrates 1200A as many as the number of rows may be included in each of the pair of columns that are the nearest to the vertical border 15B of the bottom chassis 15 in the second direction Y. For example, in the embodiment of FIG. 16, the display apparatus 5 may include a total of four first light source substrates 1200A.

With this structure, the length of the electric wire C extending from the driving board 70 to the connector 1300 arranged on the substrate body 1210 of the first light source substrate 1200A may become short, which may save the production costs of the product. Furthermore, noise from the current flowing in the electric wire C that connects the driving board 70 to the first light source substrate 1200A may be reduced.

The display apparatus 5 may include a pair of second light source substrates 1200B arranged between a pair of first light source substrates 1200A. The pair of second light source substrates 1200B may be arranged to be farther away from the border 15A or 15B of the bottom chassis 15 in the second direction Y than the pair of first light source substrates 1200A is. The pair of second light source substrates 1200B may be located farther inside of the bottom chassis 15 in the second direction Y than the pair of first light source substrates 1200A is. The pair of second light source substrates 1200B may be arranged to face each other in the second direction Y.

As shown in FIG. 16, a pair of second light source substrates 1200B may be included in one row. For example, in the embodiment of FIG. 16, the display apparatus 5 may include a total of four second light source substrates 1200B.

In this case, one or more of the plurality of second light source substrates 1200B, which are nearer to the driving board 70 in the second direction Y, may be arranged so that the substrate body 1210 is nearer to the driving board 70 in the second direction Y than the plurality of substrate bars 1220 are. One or more of the plurality of second light source substrates 1200B, which are arranged nearer to the driving board 70 in the second direction Y, may be arranged so that the substrate body 1210 is nearer to the border 15A or 15B of the bottom chassis 15 in the second direction Y than the plurality of substrate bars 1220 are.

With this structure, one or more of the plurality of second light source substrates 1200B, which are nearer to the driving board 70 in the second direction Y, may have a reduced distance between the connector 1300 and the driving board 70 and thus, make the length of the electric wire C that connects between the connector 1300 and the driving board 70 shorter.

In the meantime, of the plurality of second light source substrates 1200B, the second light source substrate 1200B located on the left (in the direction −Y) and the second light source substrate 1200B located on the right (in the direction +Y) with respect to the center of the bottom chassis 15 may be symmetrically arranged from the center of the bottom chassis 15.

Accordingly, one or more of the plurality of second light source substrates 1200B, which are more distant from the driving board 70 in the second direction Y, may be arranged so that the substrate body 1210 is farther away from the driving board 70 in the second direction Y than the plurality of substrate bars 1220 are. One or more of the plurality of second light source substrates 1200B, which are more distant from the driving board 70 in the second direction Y, may be arranged so that the substrate body 1210 is nearer to the border 15A or 15B of the bottom chassis 15 in the second direction Y than the plurality of substrate bars 1220 are.

For example, one of the pair of second light source substrates 1200B, which is arranged nearer to the first vertical border (on the left in the direction −Y of FIG. 16) than to the second vertical border (on the right in the direction +Y of FIG. 16), i.e., the second light source substrate 1200B arranged on the left (in the direction −Y) of FIG. 16, may be arranged to have the plurality of substrate bars 1220 extend toward the second vertical border, i.e., to the right (in the direction +Y) of FIG. 16, from the substrate body 1210. Symmetrically, the other one of the pair of second light source substrates 1200B, which is arranged nearer to the second vertical border than the first vertical border, i.e., the second light source substrate 1200B arranged on the right (in the direction +Y) of FIG. 16, may be arranged such that the plurality of substrate bars 1220 extend toward the first vertical border, i.e., to the left (in the direction −Y) of FIG. 16, from the substrate body 1210.

In this case, for example, the distance between the first vertical border and the second light source substrate 1200B adjacent to the first vertical border may substantially correspond to the distance between the second vertical border and the other second light source substrate 1200B adjacent to the second vertical boarder.

For example, the display apparatus 5 of FIG. 16 may have the screen 12 with a diagonal length of 65 inches, but the length is not limited thereto.

Figure 17:
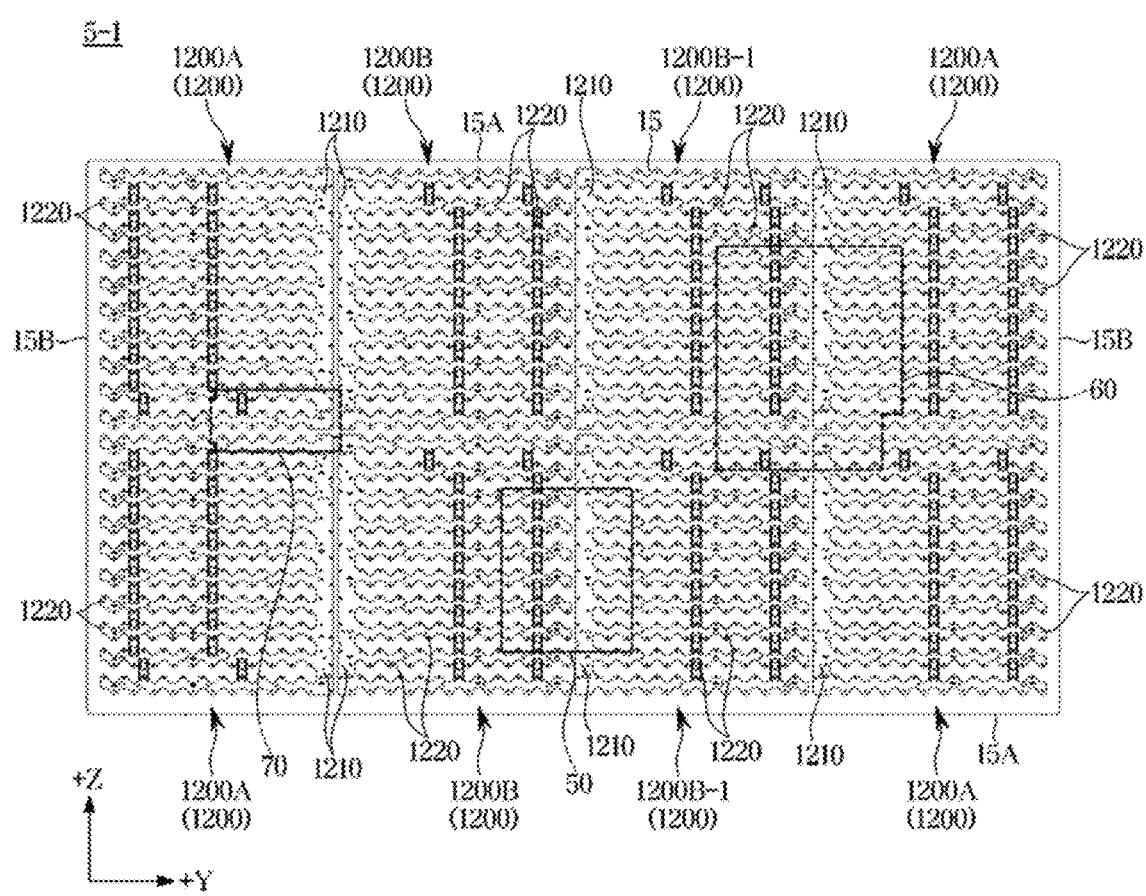
FIG. 17 is a front view of light source substrates and a bottom chassis of a display apparatus according to some embodiments of the disclosure

FIG. 17 is a front view of light source substrates and a bottom chassis of a display apparatus, according to some embodiments of the disclosure.

Referring to FIG. 10, in describing the structure of a display apparatus 5-1, overlapping components with those of the display apparatus 1 have the same reference numerals as in the embodiments of FIGS. 1 to 9 and 16, the descriptions thereof will not be repeated.

Referring to FIG. 17, in some embodiments of the disclosure, the display apparatus 5-1 may include the plurality of light source substrates 1200 and the driving board 70. In the embodiment of FIG. 17, the position where the driving board 70 is arranged is almost the same as the position where the driving board 70 is arranged in the embodiment of FIG. 16, so the detailed description will not be repeated.

Also, the layout of the first light source substrate 1200A arranged nearest to the border 15A or 15B of the bottom chassis 15 in the second direction Y among the plurality of light source substrates 1200 included in the display apparatus 5-1 is the same as in the embodiment of FIG. 16, so the detailed description will not be repeated.

The display apparatus 5-1 may include a pair of second light source substrates 1200B and 1200B-1 arranged between a pair of first light source substrates 1200A. The pair of second light source substrates 1200B and 1200B-1 may be arranged to be farther away from the border 15A or 15B of the bottom chassis 15 in the second direction Y than the pair of first light source substrates 1200A is. The pair of second light source substrates 1200B and 1200B-1 may be located farther inside of the bottom chassis 15 in the second direction Y than the pair of first light source substrates 1200A is. The pair of second light source substrates 1200B and 1200B-1 may be arranged side by side in the second direction Y.

As shown in FIG. 17, a pair of second light source substrates 1200B and 1200B-1 may be included in one row. For example, in the embodiment of FIG. 17, the display apparatus 5-1 may include a total of four second light source substrates 1200B and 1200B-1.

In this case, one or more second light source substrates 1200B, which are nearer to the driving board 70 in the second direction Y among the plurality of second light source substrates 1200B and 1200B-1, may be arranged so that the substrate body 1210 is nearer to the driving board 70 in the second direction Y than the plurality of substrate bars 1220 are. One or more of the plurality of second light source substrates 1200B, which are arranged nearer to the driving board 70 in the second direction Y, may be arranged so that the substrate body 1210 is nearer to the border 15A or 15B of the bottom chassis 15 in the second direction Y than the plurality of substrate bars 1220 are.

Furthermore, one or more second light source substrates 1200B-1, which are more distant from the driving board 70 in the second direction Y among the plurality of second light source substrates 1200B and 1200B-1, may be arranged so that the substrate body 1210 is nearer to the driving board 70 in the second direction Y than the plurality of substrate bars 1220 are. One or more second light source substrates 1200B-1, which are more distant from the driving board 70 in the second direction Y among the plurality of second light source substrates 1200B and 1200B-1, may be arranged so that the substrate body 1210 is farther away from the border 15A or 15B of the driving chassis 15 in the second direction Y than the plurality of substrate bars 1220 are.

Assuming that the driving board 70 is arranged to be nearer to the first vertical border (the left border (in the direction −Y) of FIG. 17) of the pair of vertical borders 15B, the second light source substrate 1200B (the second light source substrate 1200B arranged on the left (in the direction −Y) of FIG. 17), which is arranged nearer to the first vertical border than to the second vertical border (the right border (in the direction +Y) of FIG. 17) among the pair of second light source substrates 1200B and 1200B-1, may be arranged to have the plurality of substrate bars 1220 extend toward the first vertical border, i.e., to the right (in the direction +Y) of FIG. 17, from the substrate body 1210. Symmetrically, the other second light source substrate 1200B-1 of the pair of second light source substrates 1200B and 1200B-1, which is arranged nearer to the second vertical border than the first vertical border, i.e., the second light source substrate 1200B-1 arranged on the right (in the direction +Y) of FIG. 17, may have the plurality of substrate bars 1220 extend toward the first vertical border, i.e., to the right (in the direction +Y) of FIG. 17, from the substrate body 1210. In other words, each of the pair of second light source substrate 1200B and 1200B-1 may have the plurality of substrate bars 1220 extend from the substrate body 1210 in a direction that grows distant from the driving board 70.

With this structure, the length of extension of the electric wire C connecting the second light source substrate 1200B-1 farther from the driving board 70 in the second direction Y among the plurality of second light source substrates 1200B and 1200B-1 to the driving board 70 may become shorter and the production costs of the product may be saved. Furthermore, noise from the current flowing in the electric wire C may be reduced more efficiently.

In this case, for example, the distance between the first vertical border and the second light source substrate 1200B adjacent to the first vertical border may substantially correspond to the distance between the second vertical border and the other second light source substrate 1200B-1 adjacent to the second vertical boarder.

For example, the display apparatus 5-1 of FIG. 17 may have the screen 12 with a diagonal length of 65 inches, but the length is not limited thereto.

In the embodiments as described in connection with FIGS. 1 to 17, the terms 'first light source substrate', 'second light source substrate', 'third light source substrate', etc., are named to distinguish the plurality of light source substrates based on the positions for convenience of explanation, and the disclosure is not limited by the ordinal number given to the terms.

In the meantime, although the light source substrates are arranged such that the respective substrate bars extend from the substrate body in the horizontal direction Y in the embodiments of FIGS. 1 to 17, the light source substrates may be arranged such that the respective substrate bars extend from the substrate body in the vertical direction Z. In this case, for example, at least some of the plurality of light source substrates may be arranged farther from a horizontal border of the bottom chassis than the plurality of substrate bars are. In other words, the substrate bars of the light source substrates may each extend from the substrate body toward a nearer one of the pair of horizontal borders of the bottom chassis. This may reduce the distance between the substrate bodies of the light source substrates and the driving board and the length of electric wires connecting the connector to the driving board.

According to some embodiments of the disclosure, a display apparatus may include a display panel 20, a plurality of light source substrates 1200, a plurality of light sources 1100 mounted on the plurality of light source substrates 1200 and configured to emit light toward the display panel, a driving board 70 configured to control operation of each of the plurality of light sources, a plurality of connectors 1300 electrically connected to the driving board by an electric wire C and arranged on each of the plurality of light source substrates, and a bottom chassis 15 including vertical borders 15B extending in the vertical direction Z and configured to support the plurality of light source substrates. Each of the plurality of light source substrates may include a substrate body 1210 with one or more of the plurality of connectors are arranged therein, and a plurality of substrate bars 1220 extending in the horizontal direction Y from the substrate body and on which the plurality of light sources are mounted. The substrate body of some light source substrates 1200A may be farther away from the vertical border 15B of the bottom chassis 15 in the horizontal direction than the plurality of substrate bars 1220.

The vertical borders of the bottom chassis may be provided in one pair. Each of the plurality of substrate bars, of one of the plurality of light source substrates adjacent to one of the pair of vertical borders, may extend from the substrate body toward the one vertical border. Each of the plurality of substrate bars, of another one of the plurality of light source substrates adjacent to the another one of the pair of vertical borders, may extend from the substrate body toward the another vertical border.

A horizontal distance between the one vertical border and the one of the plurality of light source substrates may correspond to a horizontal distance between the another vertical border and the another one of the plurality of light source substrates.

The vertical borders of the bottom chassis may be provided in one pair. Each of the plurality of substrate bars, of one of the plurality of light source substrates closest to one of the pair of vertical borders, may extend from the substrate body in a direction away from the driving board. Each of the plurality of substrate bars, of another one of the plurality of light source substrates closest to another one of the pair of the vertical borders, may extend from the substrate body in the direction away from the driving board.

The vertical borders of the bottom chassis may be provided in a pair, the pair of vertical borders may include a first vertical border and a second vertical border facing each other. The plurality of light source substrates may include a pair of first light source substrates respectively arranged closest to the pair of vertical borders, and a second light source substrate between the pair of first light source substrates. The plurality of substrate bars, of one first light source substrate of the pair of first light source substrates closer to the first vertical border than to the second vertical border, may extend from the substrate body toward the first vertical border. The plurality of substrate bars, of another first light source substrate of the pair of first light source substrates closer to the second vertical border than to the first vertical border, may extend from the substrate body toward the second vertical border.

The substrate body of the second light source substrate may be adjacent to the substrate body of the one first light source substrate among the pair of first light source substrates. The plurality of substrate bars of the second light source substrate may extend from the substrate body of the second light source substrate toward the substrate body of the another first light source substrate among the pair of first light source substrates in the horizontal direction.

The vertical borders of the bottom chassis may be provided in a pair, the pair of vertical borders may include a first vertical border and a second vertical border facing each other. The plurality of light source substrates may include a pair of first light source substrates respectively arranged closest to the pair of vertical borders, and a pair of second light source substrates between the pair of first light source substrates. The plurality of substrate bars, of one second light source substrate among the pair of second light source substrates arranged closer to the first vertical border than to the second vertical border, may extend from the substrate body toward the first vertical border. The plurality of substrate bars, of another second light source substrate among the pair of second light source substrates closer to the second vertical border than to the first vertical border, may extend from the substrate body toward the second vertical border.

A horizontal distance between the first vertical border and the one second light source substrate may correspond to a horizontal distance between the second vertical border and the another second light source substrate.

A distance between the substrate body of each of the pair of second light source substrates and the driving board may be shorter than the distance between the substrate body of each of the pair of first light source substrates and the driving board.

The vertical borders of the bottom chassis may be provided in a pair, the pair of vertical borders may include a first vertical border and a second vertical border facing each other. The plurality of light source substrates may include a pair of first light source substrates respectively arranged closest to the pair of vertical borders, and a pair of second light source substrates between the pair of first light source substrates. The plurality of substrate bars, of one second light source substrate among the pair of second light source substrates closer to the first vertical border than to the second vertical border, may extend from the substrate body in a direction away from the first vertical border. The plurality of substrate bars, of another second light source substrate among the pair of second light source substrates closer to the second vertical border than to the first vertical border, may extend from the substrate body in the direction away from the second vertical border.

The plurality of light source substrates may further include a third light source substrate arranged between the pair of second light source substrates.

The third light source substrate may include a pair of third light source substrates facing each other in the horizontal direction. The plurality of substrate bars, of one third light source substrate among the pair of third light source substrates closer to the first vertical border than to the second vertical border, may extend from the substrate body toward the first vertical border. The plurality of substrate bars, of another third light source substrate among the pair of third light source substrates closer to the second vertical border than to the first vertical border, may extend from the substrate body toward the second vertical border.

The driving board and the electric wire may be arranged on a rear surface of the bottom chassis. The bottom chassis may include a plurality of projections 15d protruding from the rear surface of the bottom chassis. Each connector of the plurality of connectors on the substrate body of each of the pair of second light source substrates may pass through a portion of the bottom chassis spaced apart from the plurality of projections.

The plurality of light source substrates may be arranged in a plurality of columns and each of the plurality of columns may extend in a vertical direction of the bottom chassis and may be arranged in the horizontal direction of the bottom chassis from each other. The light source substrates, which are included in one of the plurality of columns, may include the plurality of substrate bars arranged in the vertical direction of the bottom chassis, and the substrate body in the vertical direction of the bottom chassis.

The driving board may be in a center portion of the bottom chassis.

According to some embodiments of the disclosure, a display apparatus may include a display panel 20, a plurality of light source substrates 1200, a plurality of light sources 1100 mounted on the plurality of light source substrates and configured to emit light toward the display panel, a driving board 70 configured to control operation of each of the plurality of light sources, a plurality of connectors 1300 arranged on each of the plurality of light source substrates and electrically connected to the driving board by an electric wire C, and a bottom chassis 15 including vertical borders 15B extending in the vertical direction Z and configured to support the plurality of light source substrates and the driving board. Each of the plurality of light source substrates may include a substrate body 1210 with one or more of the plurality of connectors arranged thereon, and a plurality of substrate bars 1220 extending in the horizontal direction Y from the substrate body and on which the plurality of light sources are mounted. The plurality of substrate bars, of some light source substrates 1200A arranged adjacent to the vertical border 15B of the bottom chassis 15 among the plurality of light source substrates may have the plurality of substrate bars 1220 extend from the substrate body 1210 in a direction becoming distant from the driving board 70.

The plurality of light source substrates may include a plurality of first light source substrates arranged closest to the vertical borders of the bottom chassis, and a second light source substrate arranged between the plurality of first light source substrates and parallel to the plurality of first light source substrates in the horizontal direction. The substrate body of the second light source substrate may be adjacent to the substrate body of one first light source substrate among the plurality of first light source substrates in the horizontal direction. The plurality of substrate bars of the second light source substrate may extend from the substrate body of the second light source substrate toward the substrate body of another first light source substrate among the plurality of first light source substrates in the horizontal direction.

The plurality of light source substrates may include a plurality of first light source substrates arranged closest to the vertical borders of the bottom chassis, and a plurality of second light source substrates between the plurality of first light source substrates and parallel to the plurality of first light source substrates in the horizontal direction. Each of the plurality of first light source substrates may include the plurality of substrate bars extending from the substrate body in a direction away from the driving board. Each of the plurality of second light source substrates may include the plurality of substrate bars extending from the substrate body in a direction away from the driving board.

The plurality of light source substrates may include a plurality of first light source substrates arranged closest to the vertical borders of the bottom chassis, and a plurality of second light source substrates between the plurality of first light source substrates and parallel to the plurality of first light source substrates in the horizontal direction. Each of the plurality of first light source substrates may include the plurality of substrate bars extending from the substrate body in a direction away from the driving board. Each of the plurality of second light source substrates may include the plurality of substrate bars extending from the substrate body in a direction towards to the driving board.

According to some embodiments of the disclosure, a display apparatus may include a display panel 20, a display case configured to support the display panel, a plurality of light source substrates 1200 which are accommodated in the display case, a plurality of light sources 1000 mounted on the plurality of light source substrates 1200 and configured to emit light toward the display panel, and a driving board accommodated in the display case and configured to control operation of each of the plurality of light sources. Each of the plurality of light source substrates may include a substrate body 1210 extending in a first direction and electrically connected to the driving board by an electric wire C, and a plurality of substrate bars extending from the substrate body in a second direction different from the first direction and on which the plurality of light sources are mounted. The substrate body of some light source substrates 1200A, of the plurality of light source substrates closest to borders of the display case in the second direction, may be further away from the borders of the display case in the second direction Y than the plurality of substrate bars 1220.

According to the disclosure, some of the plurality of light source substrates of the display apparatus, which are arranged adjacent to borders of the bottom chassis, may be arranged for the substrate body to be farther from the borders of the bottom chassis than the substrate bars are, which makes the length of the electric wire short and saves production costs.

According to the disclosure, some of the plurality of light source substrates of the display apparatus, which are arranged adjacent to borders of the bottom chassis, may be arranged for the substrate body to be farther from the borders of the bottom chassis than the substrate bars are, which makes the length of the electric wire short and reduces noise from the electric wire.

According to the disclosure, some of the plurality of light source substrates of the display apparatus may have the substrate bodies arranged closer to the border of the bottom chassis than the substrate bars, thereby preventing a portion of the electric wire connected to the connector from being interfered by projections of the bottom chassis.

According to the disclosure, each of the plurality of light source substrates included in the display apparatus may be configured to have regular intervals between light sources regardless of which direction the substrate body is directed to, thereby improving manufacturing efficiency of the product.

While the disclosure has been illustrated and described with reference to one or more embodiments, it will be understood that the one or more embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments described herein may be used in conjunction with any other embodiments described herein.

What is claimed is:

1. A display apparatus comprising:
a display panel;
a plurality of light source substrates;
a plurality of light sources mounted on the plurality of light source substrates and configured to emit light toward the display panel;
a driving board configured to control operation of each of the plurality of light sources;
a plurality of connectors electrically connected to the driving board by an electric wire and arranged on the plurality of light source substrates; and
a bottom chassis comprising vertical borders and configured to support the plurality of light source substrates,
wherein each of the plurality of light source substrates comprises:
a substrate body with one or more of the plurality of connectors arranged thereon; and
a plurality of substrate bars extending from the substrate body in a horizontal direction and on which the plurality of light sources are mounted, and
wherein the substrate body of some of the plurality of light source substrates is further from the vertical border of the bottom chassis in the horizontal direction than the plurality of substrate bars.

2. The display apparatus of claim 1, wherein the vertical borders of the bottom chassis are provided in a pair,
wherein each of the plurality of substrate bars, of one of the plurality of light source substrates adjacent to one of the pair of vertical borders, extends from the substrate body toward one vertical border, and
wherein each of the plurality of substrate bars, of another one of the plurality of light source substrates adjacent to another one of the pair of vertical borders, extends from the substrate body toward another vertical border.

3. The display apparatus of claim 2, wherein a horizontal distance between the one vertical border and the one of the plurality of light source substrates corresponds to a horizontal distance between the another vertical border and the another one of the plurality of light source substrates.

4. The display apparatus of claim 1, wherein the vertical borders of the bottom chassis are provided in a pair,
wherein each of the plurality of substrate bars, of one of the plurality of light source substrates closest to one of the pair of vertical borders, extends from the substrate body in a direction away from the driving board, and
wherein each of the plurality of substrate bars, of another one of the plurality of light source substrates closest to another one of the pair of the vertical borders, extends from the substrate body in the direction away from the driving board.

5. The display apparatus of claim 1, wherein the vertical borders of the bottom chassis are provided in a pair, the pair of vertical borders comprising a first vertical border and a second vertical border facing each other,
wherein the plurality of light source substrates comprise:
a pair of first light source substrates respectively arranged closest to the pair of vertical borders; and
a second light source substrate between the pair of first light source substrates,
wherein the plurality, of substrate bars of one first light source substrate of the pair of first light source substrates closer to the first vertical border than to the second vertical border, extends from the substrate body toward the first vertical border, and
wherein the plurality of substrate bars, of another first light source substrate of the pair of first light source substrates closer to the second vertical border than to the first vertical border, extends from the substrate body toward the second vertical border.

6. The display apparatus of claim 5, wherein the substrate body of the second light source substrate is adjacent to the substrate body of the one first light source substrate among the pair of first light source substrates, and
wherein the plurality of substrate bars of the second light source substrate extend from the substrate body of the second light source substrate toward the substrate body of the another first light source substrate among the pair of first light source substrates in the horizontal direction.

7. The display apparatus of claim 1, wherein the vertical borders of the bottom chassis are provided in a pair, the pair of vertical borders comprising a first vertical border and a second vertical border facing each other,
wherein the plurality of light source substrates comprise:
a pair of first light source substrates respectively arranged closest to the pair of vertical borders; and
a pair of second light source substrates between the pair of first light source substrates,
wherein the plurality of substrate bars, of one second light source substrate among the pair of second light source substrates arranged closer to the first vertical border than to the second vertical border, extends from the substrate body toward the first vertical border, and
wherein the plurality of substrate bars, of another second light source substrate among the pair of second light source substrates closer to the second vertical border than to the first vertical border, extends from the substrate body toward the second vertical border.

8. The display apparatus of claim 7, wherein a horizontal distance between the first vertical border and the one second light source substrate corresponds to a horizontal distance between the second vertical border and the another second light source substrate.

9. The display apparatus of claim 7, wherein a distance between the substrate body of each of the pair of second light source substrates and the driving board is shorter than the distance between the substrate body of each of the pair of first light source substrates and the driving board.

10. The display apparatus of claim 1, wherein the vertical borders of the bottom chassis are provided in a pair, the pair of vertical borders comprising a first vertical border and a second vertical border facing each other,
wherein the plurality of light source substrates comprise
a pair of first light source substrates respectively arranged closest to the pair of vertical borders; and
a pair of second light source substrates between the pair of first light source substrates,
wherein the plurality of substrate bars, of one second light source substrate among the pair of second light source substrates closer to the first vertical border than to the second vertical border, extends from the substrate body in a direction away from the first vertical border, and
wherein the plurality of substrate bars, of another second light source substrate among the pair of second light source substrates closer to the second vertical border than to the first vertical border, extends from the substrate body in the direction away from the second vertical border.

11. The display apparatus of claim 10, wherein the plurality of light source substrates comprise a third light source substrate arranged between the pair of second light source substrates.

12. The display apparatus of claim 11, wherein the third light source substrate comprises a pair of third light source substrates facing each other in the horizontal direction,
wherein the plurality of substrate bars, of one third light source substrate among the pair of third light source substrates closer to the first vertical border than to the second vertical border, extends from the substrate body toward the first vertical border, and
wherein the plurality of substrate bars, of another third light source substrate among the pair of third light source substrates closer to the second vertical border than to the first vertical border, extends from the substrate body toward the second vertical border.

13. The display apparatus of claim 10, wherein the driving board and the electric wire are arranged on a rear surface of the bottom chassis,
wherein the bottom chassis comprises a plurality of projections protruding from the rear surface of the bottom chassis, and
wherein each connector of the plurality of connectors on the substrate body of each of the pair of second light source substrates passes through a portion of the bottom chassis spaced apart from the plurality of projections.

14. The display apparatus of claim 1, wherein the plurality of light source substrates are arranged in a plurality of columns, each of the plurality of columns extending in a vertical direction of the bottom chassis and arranged in the horizontal direction of the bottom chassis from each other, and
wherein the light source substrates, which are included in one of the plurality of columns, comprises:
the plurality of substrate bars arranged in the vertical direction of the bottom chassis; and
the substrate body in the vertical direction of the bottom chassis.

15. The display apparatus of claim 1, wherein the driving board is in a center portion of the bottom chassis.

16. A display apparatus comprising:
a display panel;
a plurality of light source substrates;
a plurality of light sources mounted on the plurality of light source substrates and configured to emit light toward the display panel;
a driving board configured to control operation of each of the plurality of light sources;
a plurality of connectors electrically connected to the driving board by an electric wire and arranged on each of the plurality of light source substrates; and
a bottom chassis comprising vertical borders and configured to support the plurality of light source substrates and the driving board,
wherein each of the plurality of light source substrates comprises:
a substrate body with one or more of the plurality of connectors arranged thereon; and
a plurality of substrate bars extending from the substrate body in a horizontal direction and on which the plurality of light sources are mounted,
wherein the plurality of substrate bars, of some light source substrates adjacent to the vertical border of the bottom chassis among the plurality of light source substrates, extend from the substrate body in a direction away from the driving board.

17. The display apparatus according to claim 16, wherein the plurality of light source substrates comprise:
a plurality of first light source substrates arranged closest to the vertical borders of the bottom chassis; and
a second light source substrate between the plurality of first light source substrates and parallel to the plurality of first light source substrates in the horizontal direction,
wherein the substrate body of the second light source substrate is adjacent to the substrate body of one first light source substrate among the plurality of first light source substrates in the horizontal direction, and
wherein the plurality of substrate bars of the second light source substrate extend from the substrate body of the second light source substrate toward the substrate body of another first light source substrate among the plurality of first light source substrates in the horizontal direction.

18. The display apparatus according to claim 16, wherein the plurality of light source substrates comprise:
a plurality of first light source substrates arranged closest to the vertical borders of the bottom chassis; and
a plurality of second light source substrates between the plurality of first light source substrates and parallel to the plurality of first light source substrates in the horizontal direction,
wherein each of the plurality of first light source substrates comprise the plurality of substrate bars extending from the substrate body in the direction away from the driving board, and
wherein each of the plurality of second light source substrates comprise the plurality of substrate bars extending from the substrate body in the direction away from the driving board.

19. The display apparatus according to claim 16, wherein the plurality of light source substrates comprise:
a plurality of first light source substrates arranged closest to the vertical borders of the bottom chassis; and
a plurality of second light source substrates between the plurality of first light source substrates and parallel to the plurality of first light source substrates in the horizontal direction,
wherein each of the plurality of first light source substrates comprise the plurality of substrate bars extending from the substrate body in the direction away from the driving board, and
wherein each of the plurality of second light source substrates comprise the plurality of substrate bars extending from the substrate body in a direction towards to the driving board.

20. A display apparatus comprising:
a display panel;
a display case configured to support the display panel;
a plurality of light source substrates accommodated in the display case;
a plurality of light sources mounted on the plurality of light source substrates and configured to emit light toward the display panel; and
a driving board accommodated in the display case and configured to control operation of each of the plurality of light sources, wherein each of the plurality of light source substrates comprise:
- a substrate body extending in a first direction and electrically connected to the driving board by an electric wire; and
- a plurality of substrate bars extending from the substrate body in a second direction different from the first direction and on which the plurality of light sources are mounted, wherein the substrate body of some light source substrates, of the plurality of light source substrates closest to borders of the display case in the second direction, is further away from the borders of the display case in the second direction than the plurality of substrate bars.

* * * * *